(12) United States Patent
Kim et al.

(10) Patent No.: US 9,781,369 B2
(45) Date of Patent: Oct. 3, 2017

(54) IMAGE SENSOR AND IMAGE PROCESSING SYSTEM INCLUDING THE SAME

(71) Applicant: SAMSUNG ELECTRONICS CO., LTD., Suwon-si (KR)

(72) Inventors: Se Jun Kim, Seoul (KR); Jin Ho Seo, Seoul (KR); Won Baek Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 4 days.

(21) Appl. No.: 14/951,763

(22) Filed: Nov. 25, 2015

(65) Prior Publication Data

US 2016/0156863 A1 Jun. 2, 2016

(30) Foreign Application Priority Data

Nov. 27, 2014 (KR) .......................... 10-2014-0167650

(51) Int. Cl.
| | |
|---|---|
| *H04N 5/374* | (2011.01) |
| *H04N 5/359* | (2011.01) |
| *H04N 5/353* | (2011.01) |
| *H04N 5/355* | (2011.01) |
| *H04N 5/376* | (2011.01) |
| *H04N 5/378* | (2011.01) |

(52) U.S. Cl.
CPC ............. *H04N 5/374* (2013.01); *H04N 5/353* (2013.01); *H04N 5/3592* (2013.01); *H04N 5/35581* (2013.01); *H04N 5/378* (2013.01); *H04N 5/3765* (2013.01)

(58) Field of Classification Search
CPC .. H04N 5/374; H04N 5/3592; H04N 5/35581; H04N 5/353; H04N 5/378; H04N 5/3765; H04N 5/37452; H04N 5/35554; H04N 5/2355; H04N 5/355; H04N 5/35536
See application file for complete search history.

(56) References Cited

U.S. PATENT DOCUMENTS 8,274,588 B2   9/2012 Mabuchi
8,502,895 B2 *  8/2013 Yosefin ................ H04N 5/3535
                                                348/266

(Continued)

FOREIGN PATENT DOCUMENTS

JP   2009-159269 A   7/2009
JP      4487944 B2   6/2010

(Continued)

*Primary Examiner* — Albert Cutler
(74) *Attorney, Agent, or Firm* — Sughrue Mion, PLLC

(57) ABSTRACT

An image sensor which operates in a global shutter mode is provided. The image sensor includes a pixel array comprising a plurality of pixels arranged in a plurality of rows and columns, a timing generator configured to generate row driver control signals which controls an integration period of a pixel of the plurality of pixels to include at least two sub integration periods, and a row driver configured to generate a plurality of row control signals which controls each of the rows in the pixel array based on the row driver control signals, wherein the timing generator is further configured to control a single image frame to include the integration period and a readout period of the pixel, based on the row driver control signals.

20 Claims, 19 Drawing Sheets

(56) References Cited

U.S. PATENT DOCUMENTS

| | | |
|---|---|---|
| 8,723,975 B2 | 5/2014 | Solhusvik |
| 2011/0080500 A1* | 4/2011 | Wang ................. G06K 7/10722 348/231.3 |
| 2013/0188078 A1* | 7/2013 | Shim ..................... H04N 5/378 348/308 |
| 2013/0277535 A1 | 10/2013 | Takeshita et al. |
| 2014/0247378 A1* | 9/2014 | Sharma ............. H04N 5/35536 348/280 |
| 2015/0244950 A1* | 8/2015 | Johnson ............. H04N 5/3535 348/296 |

FOREIGN PATENT DOCUMENTS

| | | |
|---|---|---|
| JP | 2011-217315 A | 10/2011 |
| JP | 5150795 B2 | 2/2013 |
| KR | 10-2011-0109873 A | 10/2001 |
| KR | 10-2009-0087644 A | 8/2009 |
| KR | 10-2013-0069613 A | 6/2013 |
| KR | 10-20140027816 A | 3/2014 |
| WO | 2011/096340 A1 | 8/2011 |

\* cited by examiner

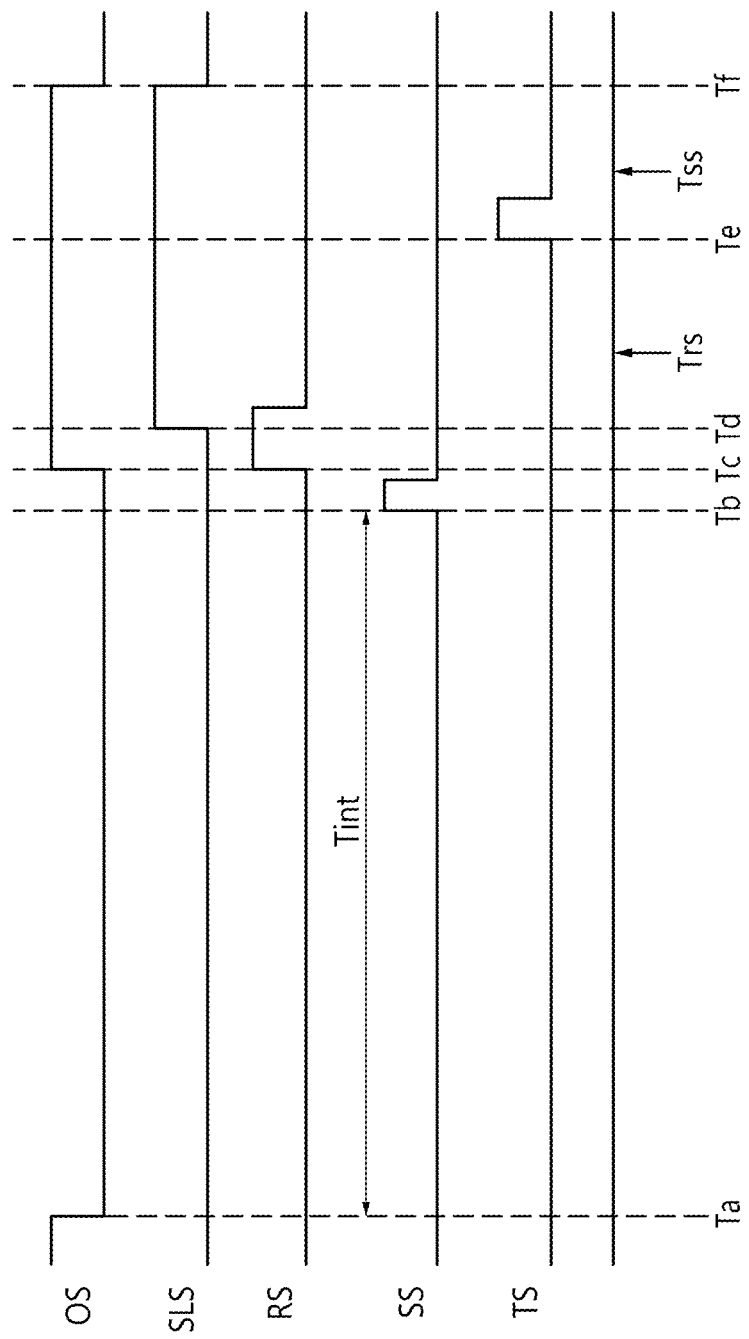

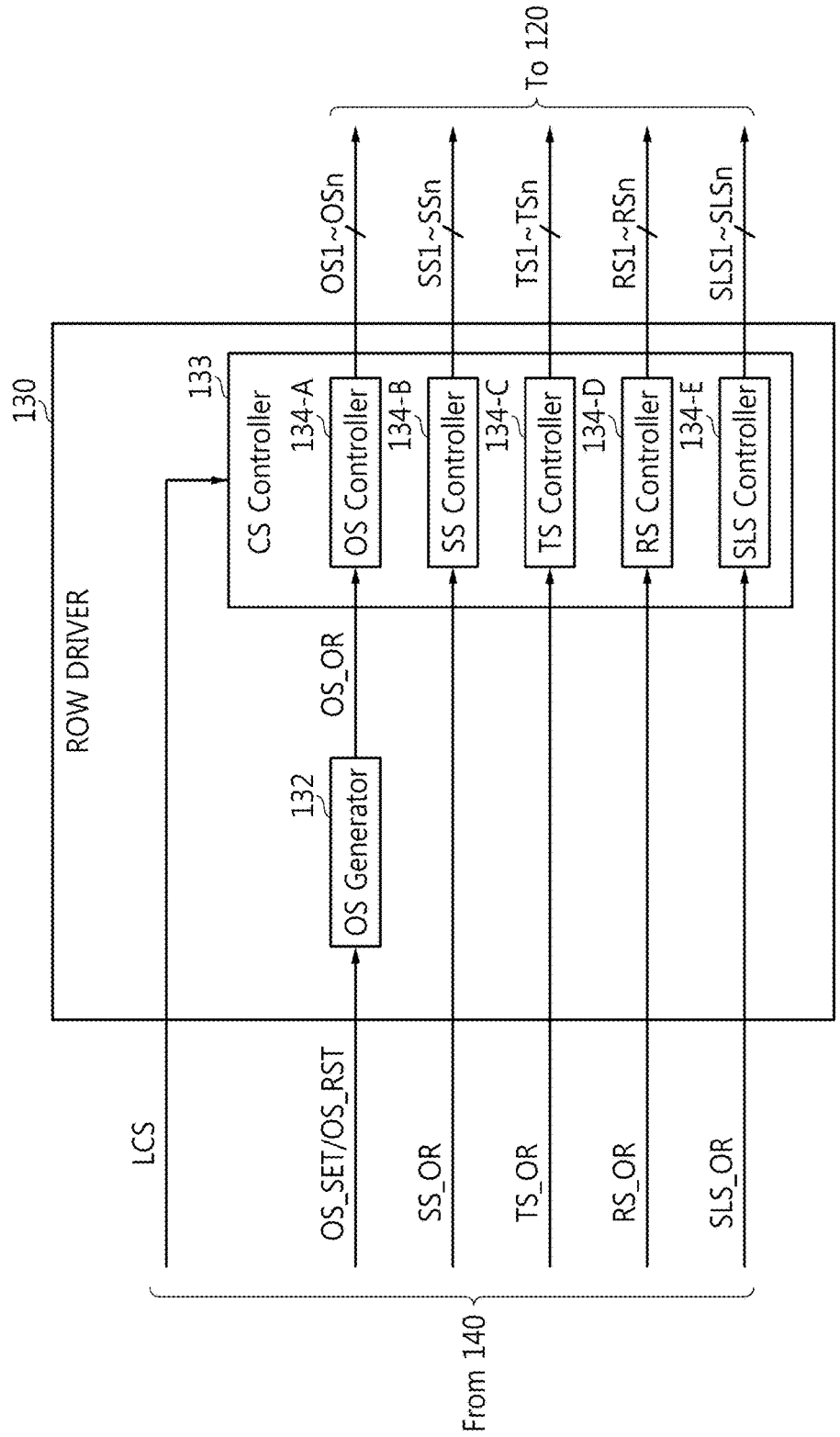

IMAGE SENSOR AND IMAGE PROCESSING SYSTEM INCLUDING THE SAME

CROSS-REFERENCE TO THE RELATED APPLICATIONS

This application claims priority from Korean Patent Application No. 10-2014-0167650 filed on Nov. 27, 2014, the disclosure of which is incorporated herein by reference in its entirety.

BACKGROUND

1. Field

Apparatuses consistent with exemplary embodiments of the inventive concept relate to an image sensor and an image processing system including the same, and more particularly, to an image sensor for providing high-quality images in a global shutter mode and an image processing system including the same.

2. Description of the Related Art

An image sensor is a device that converts an optical image into an electrical signal. An image sensor is used for digital cameras or other image processing devices. An image sensor includes a plurality of pixels.

The Mechanical shutter mode and the electrical shutter mode are largely used to control an exposure time that determines an amount of photocharges which the electrical signal is based on. The mechanical shutter mode is a method of blocking light incident on pixels using a mechanical device. The electrical shutter mode is usually used in a complementary metal-oxide semiconductor (CMOS) image sensor (CIS). It is a method of electrically controlling an integration time during which photocharges are generated and accumulated. The electrical shutter mode includes the rolling shutter mode and the global shutter mode.

The rolling shutter mode is a method of controlling an integration time to be different for each row in a pixel array. The global shutter mode is a method of controlling an integration time to be the same throughout all rows in a pixel array.

The global shutter mode has an advantage of eliminating image distortion caused by different integration times among rows. However, it has some disadvantages in that it does not provide any solutions, such as capturing images of a fast moving object without blur and using a high dynamic range (HDR) mode by proper exposure, for providing high-quality images. Therefore, some improvements are desired.

SUMMARY

According to some exemplary embodiments of the inventive concept, there is provided an image sensor which operates in a global shutter mode. The image sensor may include a pixel array comprising a plurality of pixels arranged in a plurality of rows and columns, a timing generator configured to generate row driver control signals which controls an integration period of a pixel of the plurality of pixels to include at least two sub integration periods, and a row driver configured to generate a plurality of row control signals which controls each of the rows in the pixel array based on the row driver control signals, wherein the timing generator is further configured to control a single image frame to include the integration period and a readout period of the pixel, based on the row driver control signals.

The row driver may accumulate photocharges at the pixel during each of the at least two sub integration periods and reset the pixel at an end of each of the at least two sub integration periods, based on the row control signals.

The pixel may include a photo element and a storage element such as a photo diode and a storage diode, respectively. The row driver may accumulate the photocharges at the photo element and transfer the accumulated photocharges to the storage element for storing thereat at an end of each of the at least two sub integration periods, based on the row control signals.

The row control signals may include an overflow control signal and a storage control signal. The overflow control signal and the storage control signal may have a high level at least two times in the integration period.

The timing generator may include a multi-exposure controller configured to generate a multi-exposure signal having a high level corresponding to a multi-exposure period in the integration period and a row driver controller configured to generate the row driver control signals according to a multi-exposure control signal generated based on the multi-exposure signal.

The timing generator may further include a multi-exposure register configured to temporarily stores the multi-exposure signal and transmit the multi-exposure signal to a sensor controller and a control register including an external trigger register configured to temporarily store an external trigger generated by the sensor controller based on the multi-exposure signal and to output the external trigger as the multi-exposure control signal to the row driver controller.

The row driver controller may detect a rising edge of the external trigger and generate the row driver control signals for controlling one of the at least two sub integration periods to end and the row driver controller may detect a falling edge of the external trigger and generate the row driver control signals for controlling one of the at least two sub integration periods to begin.

Alternatively, the timing generator may further include a control register block including a pointer register configured to temporarily store a point received from a sensor controller and transmit the pointer to the row driver controller. The row driver controller may include a counter configured to begin to count in response to the multi-exposure signal and generate a count value and a comparator configured to output a result of comparing the pointer with the count value as the multi-exposure control signal.

The row driver controller may generate the row driver control signals for controlling one of the at least two sub integration periods to end in response to the count value being the same as a first value of the pointer and the row driver controller may generate the row driver control signals for controlling one of the at least two sub integration periods to start in response to the count value being the same as a second value of the pointer.

The timing generator may generate a line control signal having a high level in the multi-exposure period. The row driver may include a control signal generator configured to generate a plurality of original row control signals corresponding to the row driver control signals and a control signal controller configured to generate the row control signals by buffering or transforming the original row control signals according to the line control signal.

The control signal controller may transform the original row control signals corresponding to some of the rows to have a low level in response to the line control signal being at a high level.

The control signal controller may buffer the original row control signals corresponding to all of the rows in response to the line control signal being at a low level.

According to other exemplary embodiments of the inventive concept, there is provided an image processing system which may include the above image sensor which performs analog-to-digital conversion on a pixel signal corresponding to the photocharges to generate a digital pixel signal; and an image signal processor configured to process the digital pixel signal to generate image data.

The image signal processor may perform a de-blurring process or a high dynamic range (HDR) process on the digital pixel signal.

According to further exemplary embodiments of the inventive concept, there is provided an image sensor which operates in a global shutter mode. The image sensor may include a pixel array which includes a plurality of pixels arranged in a plurality of rows and columns, each pixel being configured to generate a pixel signal corresponding to photocharges, and a pixel controller configured to control an integration period of a pixel of the plurality of pixels to comprise at least two sub integration periods at a control of an external signal, wherein the integration period is a period between two successive readout periods of the pixel.

The image sensor may further include a row driver which accumulates the photocharges at the pixel during each of the at least two sub integration periods and resets the pixel at an end of each of the at least two sub integration periods.

The pixel may include a photo element and a storage element, and the row driver may accumulate the photocharges at the photo element and transfer the accumulated photocharges to the storage element for storing thereat at an end of each of the at least two sub integration periods.

The photo element may include a photo diode, and the storage element may include a storage diode.

According to further exemplary embodiments of the inventive concept, there is provided a method of controlling an image sensor which includes a plurality of pixels arranged in a plurality of rows and columns. The method may include receiving a control signal to divide an integration period of a pixel of the plurality of pixels into at least two sub integration periods, the integration period being a period included in a single image frame which also includes a readout period of the pixel, and controlling to accumulate photocharges at the pixel during each of the at least two sub integration periods and reset the pixel at an end of each of the at least two sub integration periods.

The accumulating the photocharges at the pixel may include accumulating the photocharges at a photo element of the pixel, and transferring the accumulated photocharges to a storage element of the pixel for storing thereat at an end of each of the at least two sub integration periods.

BRIEF DESCRIPTION OF THE DRAWINGS

The above and other aspects of the inventive concept will become more apparent by describing in detail exemplary embodiments thereof with reference to the attached drawings, in which:

FIG. 3 is a timing chart of control signals applied to the pixel illustrated in FIG. 2 in a comparison example, according to an exemplary embodiment of the inventive concept;

FIG. 10 is a block diagram of a row driver illustrated in FIGS. 5 and 7 according to an exemplary embodiment of the inventive concept;

DETAILED DESCRIPTION OF THE EXEMPLARY EMBODIMENTS

Figure 1:
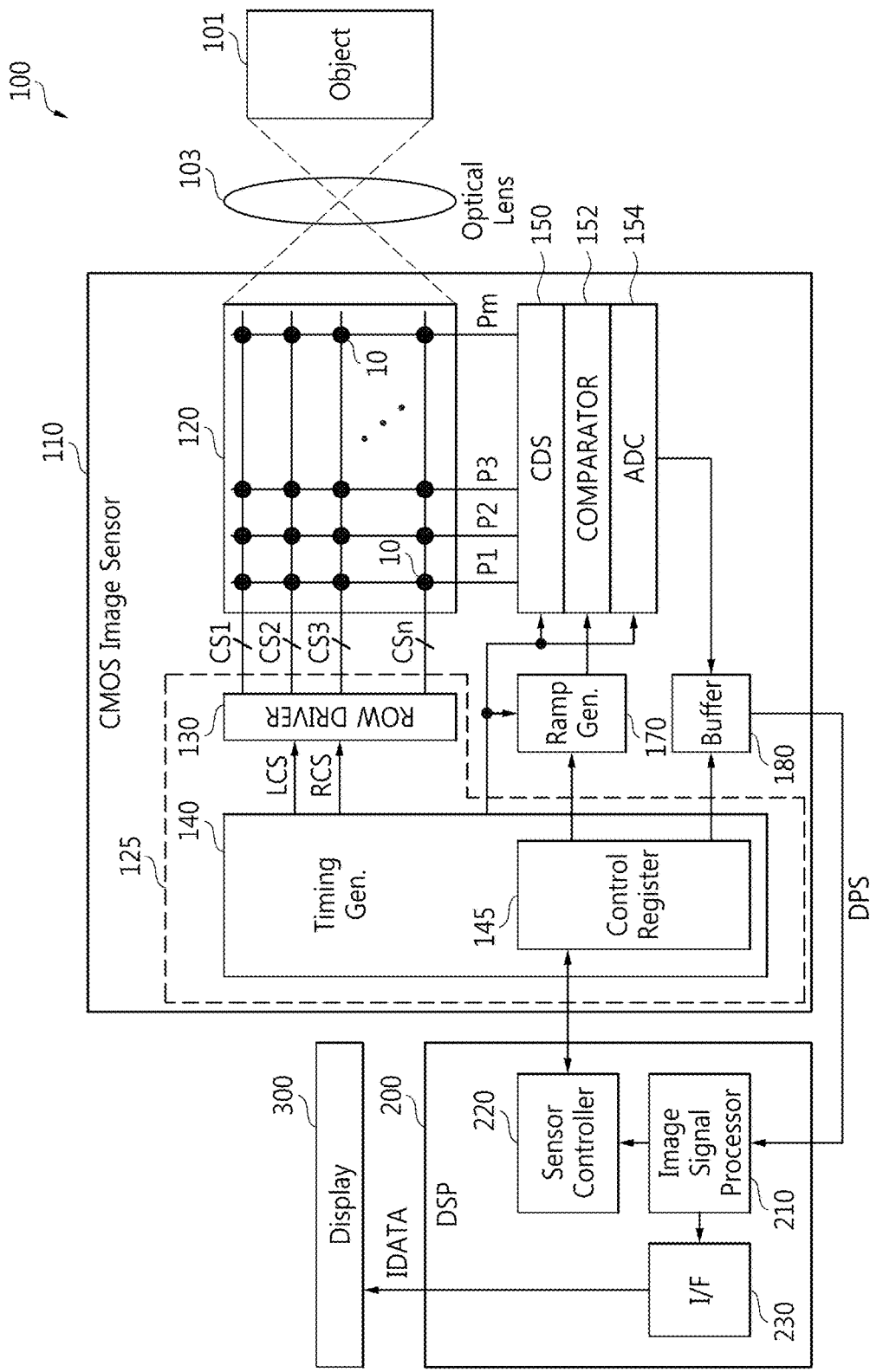
FIG. 1 is a block diagram of an image processing system, according to an exemplary embodiment of the inventive concept.

The inventive concept now will be described more fully hereinafter with reference to the accompanying drawings, in which exemplary embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an image processing system 100 according to exemplary embodiments of the inventive concept. The image processing system 100 may be implemented in or as a portable electronic device such as a laptop computer, a cellular phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an Internet of things (IoT) device, or an Internet of everything (IoE) device.

The image processing system 100 includes an optical lens 103, a complementary metal-oxide-semiconductor (CMOS) image sensor 110, a digital signal processor (DSP) 200, and a display 300. The components 110 and 200 may be implemented in a chip.

The CMOS image sensor 110 may generate a digital pixel signal DPS corresponding to an object 101 input (or captured) through the optical lens 103. The CMOS image sensor 110 includes a pixel (or an active pixel sensor (APS)) array 120, a pixel controller 125, a correlated double sampler (CDS) 150, a comparator 152, an analog-to-digital converter (ADC) 154, a ramp generator 170, and a buffer 180.

The CMOS image sensor 110 may be configured to be able to operate in a global shutter mode. The global shutter mode includes a method of controlling an integration period, in which a photo diode (e.g., PD in FIG. 2), corresponding to a pixel, in the pixel array 120 accumulates photocharges, to be uniform throughout all rows in the pixel array 120.

The integration period is from a time point at which photocharges begin to be accumulated at a photo diode, after a readout of all rows in the pixel array 120 is completed, to a time point at which photocharges finally begin to be stored at a storage diode prior to a next readout of all rows in the pixel array 120. Operations of the photo diode and the storage diode it will be described later in reference to FIGS. 2 and 3. In contrast, an integration time may be the same among all rows or among certain rows only (e.g., odd-numbered rows or even-numbered rows). The integration time refers to a time during which a photo diode actually accumulates photocharges. For instance, referring to FIG. 6, an integration period may be from a time point Ta to a time point Tb, and an integration time may be a sum of sub integration periods Tsi1, Tsi2 and Tsi3.

The pixel array 120 includes a plurality of pixels 10 arranged in a matrix. The structure and operations of the pixel array 120 and the pixels 10 will be described in detail with reference to FIG. 2 later. Each of the pixels 10 may be referred to as a unit pixel in the regard that the pixels 10 form one pixel array 120.

The pixel controller 125 controls an overall operation of the image sensor 110. The pixel controller 125 may include a row driver 130 and a timing generator 140.

The row driver 130 may transmit a plurality of row control signals CS1 through CSn for controlling operations of the pixels 10 to the pixel array 120 according to a control of the timing generator 140. In other words, the row driver 130 may generate the row control signals CS1 through CSn based on a plurality of row driver control signals RCS received from the timing generator 140. The row control signals CS1 through CSn correspond to "n" rows, respectively, in the pixel array 120, so that it can be said that the pixel array 120 is controlled by rows. The row control signals CS1 through CSn may be divided into overflow control signals OS1 through OSn, storage control signals SS1 through SSn, transfer control signals TS1 through TSn, reset control signals RS1 through RSn, and selection control signals SLS1 through SLSn by types of signals, as shown in FIG. 10.

The timing generator 140 may include a control register 145. The control register 145 controls operations of the timing generator 140, the ramp generator 170 and the buffer 180 according to a control of the digital signal processor (DSP) 200. The timing generator 140 may control operations of the row driver 130, the CDS 150, the ADC 154 and the ramp generator 170 according to the control of the control register 145.

The timing generator 140 may generate the row driver control signals RCS for controlling an integration period of each pixel 10 to include at least two sub exposure periods. The timing generator 140 may also generate a line control signal LCS according to the control of the control register 145 to control the row driver 130 so that an integration time is different between certain row groups (e.g., an even-numbered row group and an odd-numbered row group). The structure and operations of the row driver 130, the timing generator 140, and the control register 145 will be described in detail with reference to FIGS. 5 through 12 later.

The CDS 150 performs CDS on pixel signals P1 through Pm (where "m" is a natural number) output from respective column lines formed in the pixel array 120. The comparator 152 compares each of the pixel signals (e.g., voltage levels), on which the CDS is performed in the CDS 150, with a ramp signal (e.g., a voltage level) output from the ramp generator 170, and outputs comparison signals according to the comparison result.

The ADC 154 converts the comparison signals received from the comparator 152 into digital signals, and outputs the digital signals to the buffer 180. The CDS 150, the comparator 152 and the ADC 154 may form a readout circuit.

The buffer 180 transmits digital pixel signals DPS corresponding to the digital signals output from the ADC 154 to the DSP 200. The DSP 200 includes an image signal processor 210, a sensor controller 220 and an interface 230.

The image signal processor 210 controls the interface 230 and the sensor controller 220 which controls the control register 145. The image sensor 110 and the DSP 200 may be respectively implemented in chips in a single package, e.g., a multi-chip package. Alternatively, the image sensor 110 and the image signal processor 210 may be respectively implemented in chips in a single package, e.g., a multi-chip package. As another alternative, the image sensor 110 and the image signal processor 210 may be implemented together in a single chip, not being limited thereto.

The image signal processor 210 processes the digital pixel signals DPS received from the buffer 180, and transmits the processed image data IDATA to the interface 230. The image signal processor 210 may perform a de-blurring process and/or a high dynamic range (HDR) process based on the digital pixel signals DPS obtained through a multi exposure.

The de-blurring process is an operation of extracting a motion vector based on an image obtained by dividing an integration period into at least two sub integration periods to eliminate a blur. The HDR process is an operation of generating a single image based on images obtained with different integration times (e.g., an image corresponding to odd-numbered rows and an image corresponding to even-numbered rows) to clearly represent both dark and bright portions.

The sensor controller 220 generates various control signals for controlling the control register 145 according to the control of the image signal processor 210. The control signals may include an eternal trigger ET illustrated in FIG. 5, a pointer PNT illustrated in FIG. 7, and a line control LC illustrated in FIGS. 5 and 7, which will be described with reference to FIGS. 5 and 7 later.

The interface 230 transmits the processed image data IDATA from the image signal processor 210 to the display 300. The display 300 displays the image data IDATA output from the interface 230. The display 300 may be a thin film transistor-liquid crystal display (TFT-LCD), a light emitting diode (LED) display, an organic LED (OLED) display, or an active-matrix OLED (AMOLED) display, not being limited thereto.

Figure 2:
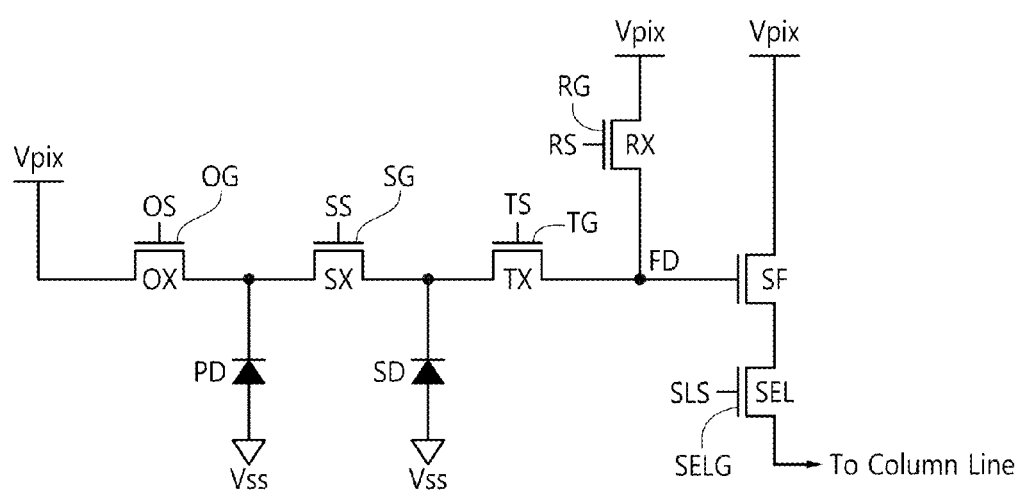
FIG. 2 is a circuit diagram of a pixel illustrated in FIG. 1, according to an exemplary embodiment of the inventive concept.

FIG. 2 is a circuit diagram of a pixel 10 illustrated in FIG. 1, according to an exemplary embodiment. Referring to FIGS. 1 and 2, the pixel 10 includes a photo diode PD, an overflow transistor OX, a storage transistor SX, a storage diode SD, a transfer transistor TX, a reset transistor RX, a source follower SF, and a selection transistor SEL.

The photo diode PD accumulates or collects photocharges generated in response to incident light. The photo diode PD is an example of a photoelectric conversion element, and may be at least one among a photo transistor, a photo gate, a pinned photo diode (PPD), and a combination thereof, not being limited thereto The overflow transistor OX is connected between a pixel voltage Vpix and the photo diode PD. A gate OG of the overflow transistor OX is used to prevent charges generated by the photo diode PD from overflowing into the storage diode SD. The overflow transistor OX is turned on or off in response to an overflow control signal OS. The overflow control signal OS may be one among the overflow control signals OS1 through OSn illustrated in FIG. 10. The gate OG of the overflow transistor OX may be referred to as an overflow gate OG. The pixel voltage Vpix may be lower than a power supply voltage (e.g., 5 V), but the inventive concept is not limited thereto.

For instance, when an intensity of light incident on the pixel 10 is high (e.g., when an image of the sun or a light source is captured, that is, in case of a white level or high illuminance) or when photocharges generated during a time outside an integration period (Tint in FIG. 3) are collected at the photo diode PD, the overflow transistor OX is used to prevent photocharges (e.g., electrons) generated in the photo diode PD from overflowing into the storage diode SD. In addition, the overflow transistor OX is also used to remove or reset photocharges that have been accumulated at the photo diode PD right before the beginning of the integration period Tint.

The storage transistor SX is connected between the photo diode PD and the storage diode SD. Charges transferred from the photo diode PD are stored in the storage diode SD through the storage transistor SX. The storage transistor SX is turned on or off in response to a storage control signal SS applied to its gate SG. The storage control signal SS may be one among the storage control signals SS1 through SSn illustrated in FIG. 10. The gate SG of the storage transistor SX may be referred to as a storage gate SG.

The storage diode SD may store charges transferred from the photo diode PD. The storage diode SD may be implemented in a similar structure to the photo diode PD or implemented as a capacitor. The photo diode PD and the storage diode SD may be connected to a ground voltage VSS.

The transfer transistor TX is connected between the storage diode SD and the floating diffusion FD. Charges stored in the storage diode SD are stored or accumulated in the floating diffusion FD through the transfer transistor TX. The transfer transistor TX is turned on or off in response to a transfer control signal TS applied to its gate TG. The transfer control signal TS may be one among the transfer control signals TS1 through TSn illustrated in FIG. 10. The gate TG of the transfer transistor TX may be referred to as a transfer gate TG.

The reset transistor RX is connected between the pixel voltage Vpix and the floating diffusion FD. The reset transistor RX may eliminate photocharges (e.g., electrons) from the floating diffusion FD in response to a reset control signal RS. In other words, when the reset transistor RX is turned on, the voltage level of the floating diffusion FD may be reset to the pixel voltage Vpix. The reset control signal RS may be one among the reset control signals RS1 through RSn illustrated in FIG. 10. A gate RG of the reset transistor RX may be referred to as a reset gate RG.

The source follower SF is connected between the pixel voltage Vpix and the selection transistor SEL. The source follower SF operates based on a voltage level determined by charges at the floating diffusion FD.

The pixel voltage Vpix is applied in common to the overflow transistor OX, the reset transistor RX and the source follower SF in the embodiment illustrated in FIG. 2, for convenience' sake in the description. However, operating voltages respectively applied to the overflow transistor OX, the reset transistor RX and the source follower SF may be designed to be different from one another.

The selection transistor SEL may output an output signal (e.g., an analog pixel signal) of the source follower SF to a column line in response to a selection control signal SLS. The selection control signal SLS may be one among the selection control signals SLS1 through SLSn illustrated in FIG. 10. A gate SELG of the selection transistor SEL may be referred to as a selection gate SELG.

FIG. 3 is a timing chart of control signals applied to the pixel 10 illustrated in FIG. 2 in a comparison example, according to an exemplary embodiment. FIGS. 4A through 4D are electric potential diagrams at different time points illustrated in FIG. 3. Referring to FIGS. 2 through 4D, operations of the pixel 10 when the control signals OS, SLS, RS, SS, and TS illustrated in FIG. 3 showing the comparison example of the embodiment are applied to the pixel 10 will be described.

The electric potential diagrams illustrated in FIGS. 4A through 4D show electric potentials of the overflow gate OG, the photo diode PD, the storage gate SG, the storage diode SD, the transfer gate TG, the floating diffusion FD, and the reset gate RG. In the drawings, the electric potentials are indicated as increasing in the downward direction. The overflow control signal OS is at a high level right before a time point Ta (see FIG. 3). Accordingly, charges in the photo diode PD are discharged to the pixel voltage Vpix so that the photo diode PD is reset.

Figure 4A:
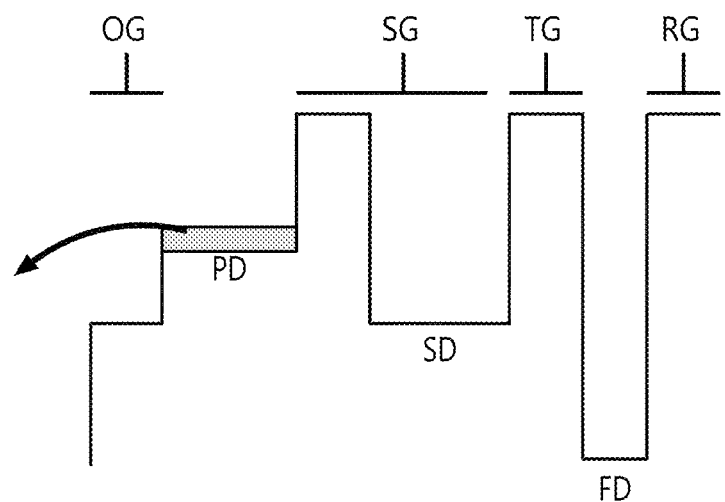
FIGS. 4A through 4D are electric potential diagrams at different time points illustrated in FIG. 3, according to exemplary embodiments of the inventive concept.

FIG. 4A is the electric potential diagram obtained right before the time point Ta. As the overflow control signal OS is at the high level, the charges at the photo diode PD are discharged to the pixel Vpix. When the overflow control signal OS transits to a low level at the time point Ta, accumulation of photocharges by the photo diode PD begins.

Figure 4B:
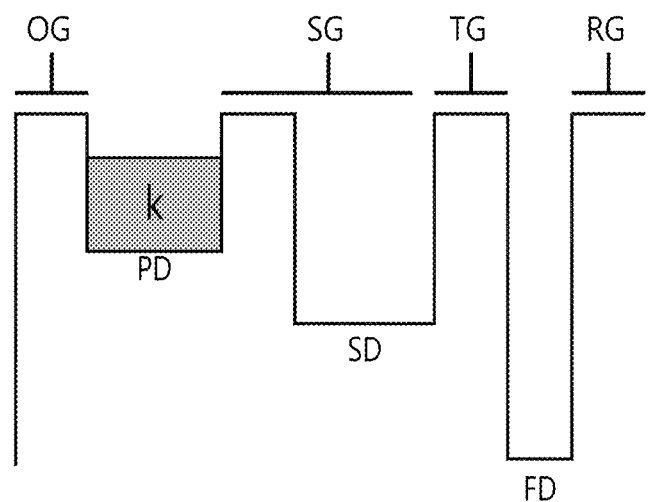

FIG. 4B is the electric potential diagram obtained between time points Ta and Tb. As the overflow control signal OS transits to the low level, accumulation of photocharges by the photo diode PD begins, as described above. During the integration period Tint defined by the time points Ta and Tb, the photo diode PD accumulates charges generated from incident light. The storage control signal SS transits to a high level at the time point Tb. As the storage control signal SS transits to the high level, charges "k" accumulated at the photo diode PD are stored in the storage diode SD through the storage transistor SX.

Figure 4C:
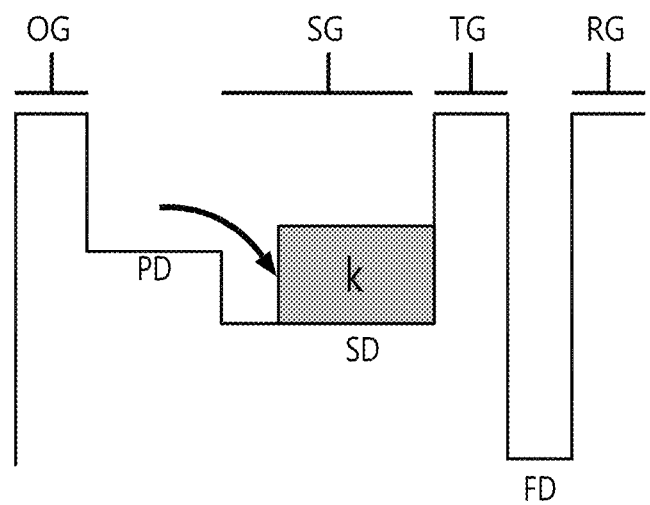

FIG. 4C is the electric potential diagram obtained right after the time points Tb. The charges "k" accumulated at the photo diode PD having a low potential are stored in the storage diode SD having a relatively high potential through the storage transistor SX. The overflow control signal OS and the reset control signal RS transit to the high level at a time point Tc.

As the overflow control signal OS transits to the high level, charges at the photo diode PD are discharged to the pixel voltage Vpix. As a result, charges accumulated at the photo diode PD from a time point Tc to a time point Tf do not overflow into the storage diode SD. As the reset control signal RS transits to the high level, charges transferred from the storage diode SD to the floating diffusion FD are discharged to the pixel voltage Vpix.

The selection control signal SLS transits to a high level at a time point Td. Sampling of a reset signal is performed at a time point Trs. The reset signal may be a pixel signal that is output according to a voltage level of the floating diffusion FD right after the floating diffusion FD is reset to the pixel voltage Vpix. The sampling of the reset signal may be performed by the CDS 150 and the comparator 152.

The transfer control signal TS transits to a high level at a time point Te. As the transfer control signal TS transits to the high level, the charges "k" stored at the storage diode SD are transferred to the floating diffusion FD.

Figure 4D:
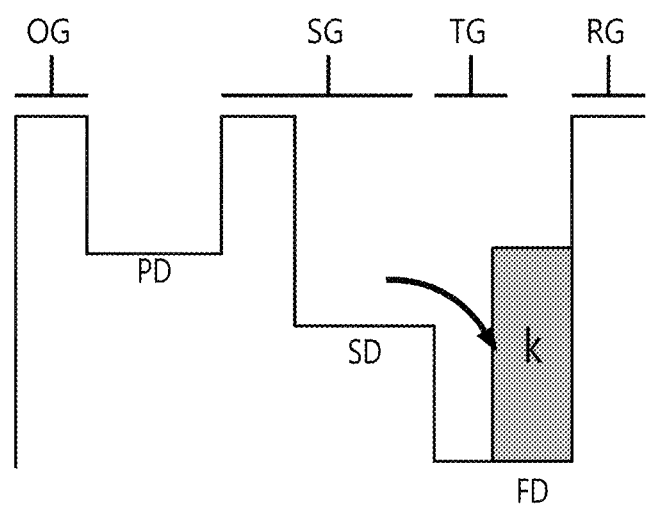

FIG. 4D is the electric potential diagram obtained right after the time points Te. The charges "k" stored at the storage diode SD having a low potential are transferred to and stored in the floating diffusion FD having a relatively high potential.

Sampling of an image signal is performed at a time point Tss. The image signal may be a pixel signal that is output according to a voltage level of the floating diffusion FD right after the charges "k" stored in the storage diode SD are completely transferred to the floating diffusion FD. The sampling of the image signal may be performed by the CDS 150 and the comparator 152. As the selection control signal SLS transits to a low level at the time point Tf, a sampling operation on the floating diffusion FD is completed.

Since the image sensor 110 operates in the global shutter mode, the integration period Tint may be the same among all rows in the pixel array 120. In other words, every row in the pixel array 120 outputs a pixel signal corresponding to photocharges accumulated at a photo diode PD during the integration period Tint which is a continuous duration of time.

Figure 5:
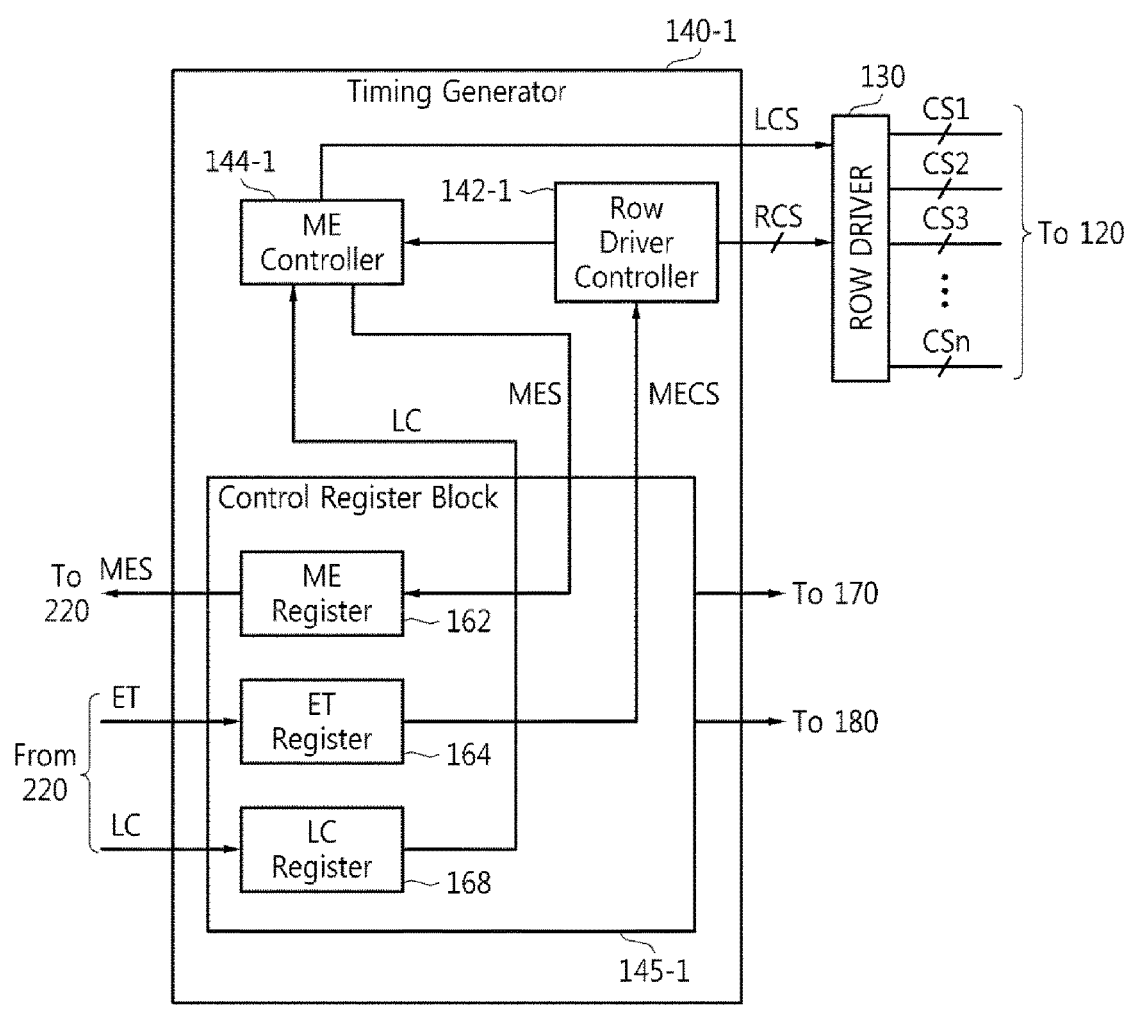
FIG. 5 is a block diagram of an example of a pixel controller illustrated in FIG. 1.
Figure 6:
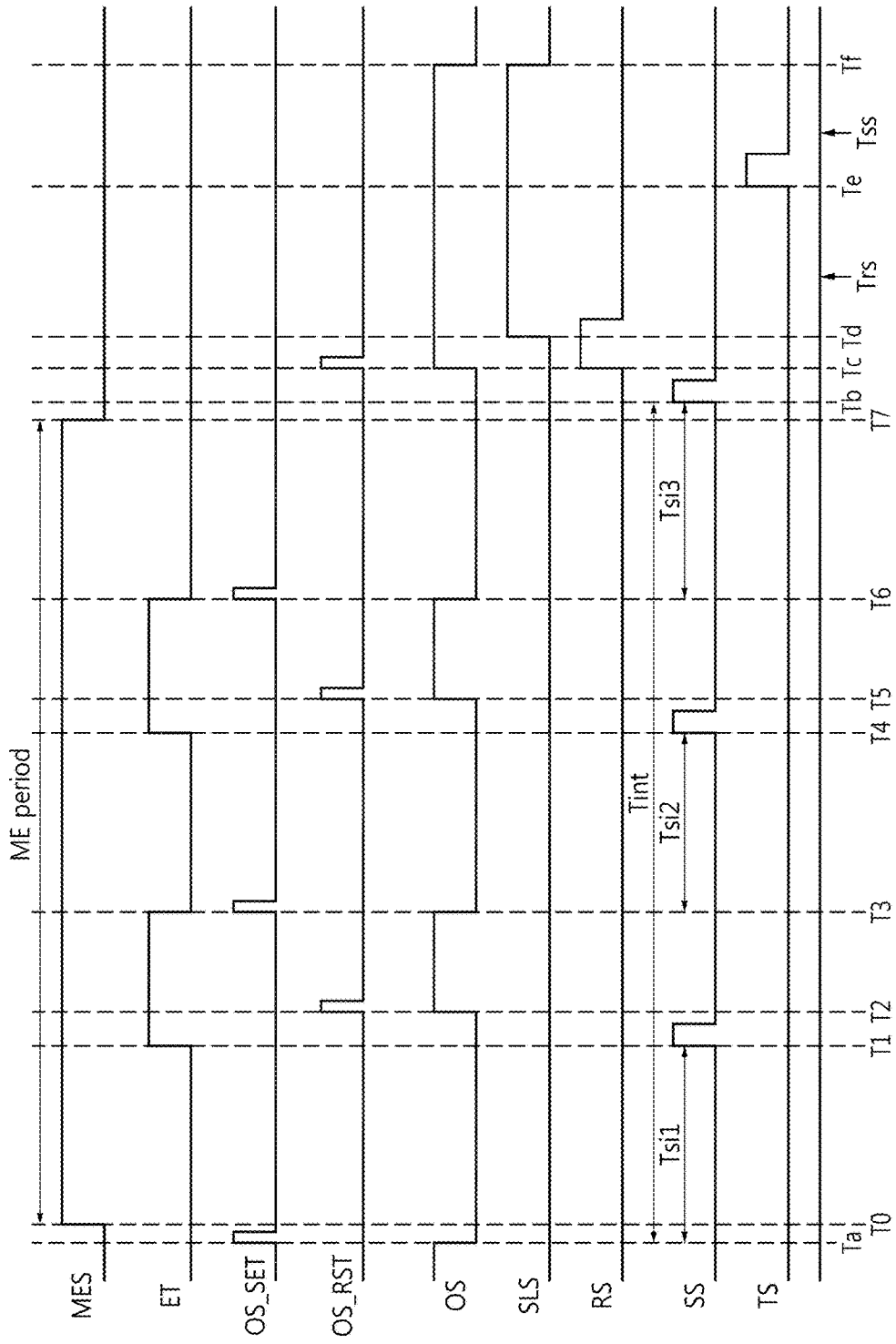
FIG. 6 is a timing chart showing the operation of the pixel controller illustrated in FIG. 5, according to an exemplary embodiment of the inventive concept.

FIG. 5 is a block diagram of an example 125-1 of the pixel controller 125 illustrated in FIG. 1. FIG. 6 is a timing chart showing an operation of a pixel controller 125-1 illustrated in FIG. 5. Referring to FIGS. 1 through 6, the pixel controller 125-1 may include the row driver 130 and a timing generator 140-1.

The row driver 130 may receive the line control signal LCS and the row driver control signals RCS, and may generate the row control signals CS1 through CSn for controlling respective rows in the pixel array 120. As described above, the row control signals CS1 through CSn include the overflow control signals OS1 through OSn, the storage control signals SS1 through SSn, the transfer control signals TS1 through TSn, the reset control signals RS1 through RSn, and the selection control signals SLS1 through SLSn by types of signals.

The row driver control signals RCS may include overflow set and reset signals OS_SET and OS_RST, an original storage control signal SS_OR, an original transfer control signal TS_OR, an original reset control signal RS_OR, and an original selection control signal SLS_OR which are the bases of the overflow control signals OS1 through OSn, the storage control signals SS1 through SSn, the transfer control signals TS1 through TSn, the reset control signals RS1 through RSn, and the selection control signals SLS1 through SLSn, as shown in FIG. 10. The operation of the row driver 130 according to the line control signal LCS and the row driver control signals RCS will be described in detail with reference to FIGS. 10 through 12 later.

The timing generator 140-1 may include a row driver controller 142-1, a multi-exposure (ME) controller 144-1 and a control register 145-1.

The row driver controller 142-1 may generate the row driver control signals RCS, and may divide a single frame into the integration period Tint and a readout period based on the row driver control signals RCS. The integration period Tint is from the time point Ta at which photocharges begin to be accumulated at the photo diode PD, after a readout of all rows in the pixel array 120 is completed, to the time point Tb at which photocharges finally begin to be stored at the storage diode SD before a next readout of all rows in the pixel array 120 begins. The readout period is the period of a single frame outside the integration period Tint, and includes a readout time and a signal processing time for every row in the pixel array 120.

The row driver controller 142-1 may provide the timings of the integration period Tint and the readout period for the ME controller 144-1. The row driver controller 142-1 may generate the row driver control signals RCS according to an ME control signal MECS received from the control register 145-1.

The ME controller 144-1 may generate an ME signal MES having a high level corresponding to an ME period in the integration period Tint based on the timing of the integration period Tint provided from the row driver controller 142-1. The ME period may have a length which does not exceed the integration period Tint. The ME controller 144-1 may transmit the ME signal MES to the control register 145-1.

The ME controller 144-1 may generate the line control signal LCS based on the timing of the ME signal MES and the line control LC received from the control register 145-1, and transmit the line control signal LCS to the row driver 130. For instance, when the line control LC is at a high level, the line control signal LCS may be the same as the ME signal MES or may be at a high level within the ME period. When the line control is at a low level, the line control signal LCS may remain at a low level.

The control register 145-1 may include an ME register 162, an external trigger (ET) register 164 and a line control (LC) register 168. The ME register 162 may temporarily store the ME signal MES, and transmit it to the sensor controller 220. The ET register 164 may temporarily store an external trigger ET received from the sensor controller 220, and output the external trigger ET as the ME control signal MECS to the row driver controller 142-1.

The external trigger ET may be generated by the sensor controller 220 based on the ME signal MES. For instance, when the sensor controller 220 divides the integration period Tint into three sub integration periods Tsi1, Tsi2 and Tsi3, as shown in FIG. 6, the external trigger ET that has a high level two times in the integration period Tint may be generated. Although the integration period Tint is divided into three sub integration periods Tsi1, Tsi2 and Tsi3 in the embodiment illustrated in FIG. 6, the inventive concept is not limited thereto. The integration period Tint may be divided into at least two sub integration periods in other exemplary embodiments. At this time, the overflow control signal OS and the storage control signal SS may have a high level at least two times in the integration period Tint. The number of times the external trigger ET has the high level and a duration of the high level may be randomly determined, but information about the external trigger ET may be provided to the image signal processor 210 for the process (such as a de-blurring or HDR process) performed by the image signal processor 210.

The LC register 168 may temporarily store the line control LC received from the sensor controller 220, and output the line control LC to the ME controller 144-1. The line control LC may be generated by the sensor controller 220 according to the necessity of an HDR process by the image signal processor 210. In other words, when the HDR process by the image signal processor 210 is necessary, the line control LC may be at a high level. When the HDR process is not necessary, the line control LC may be at a low level.

The operations performed from the time point Ta to the time point Tf illustrated in FIG. 6 are substantially the same as that described with reference to FIG. 3. Thus, detailed descriptions thereof will be omitted. However, photocharges transferred to the storage diode SD at the time point Tb have not been accumulated during the single continuous integration period Tint but during three separate periods Tsi1 through Tsi3.

The overflow set signal OS_SET and the overflow reset signal OS_RST are included in the row driver control signals RCS, and may determine a level of the overflow control signal OS. In other words, the overflow control signal OS transits to a low level at a rising edge of the overflow set signal OS_SET and transits to a high level at a rising edge of the overflow reset signal OS_RST.

The ME signal MES transits to a high level at a time point T0 and remains at the high level till a time point T7. A period of the high level of the ME signal MES is the ME period.

The external trigger ET transits to a high level at a time point T1. The row driver controller 142-1 detects a rising edge of the external trigger ET, and sequentially generates a pulse of the original storage control signal SS_OR and a pulse of the overflow reset signal OS_RST. A time interval between the pulses may be modulated according to the features (such as a potential difference between the photo diode PD and the storage diode SD) of the pixel 10.

As the external trigger ET transits to the high level at the time point T1, the storage control signal SS is at a high level during a certain period of time. Accordingly, photocharges accumulated from the time point Ta to the time point T1, i.e., during the first sub integration period Tsi1 are transferred from the photo diode PD to the storage diode SD.

In other words, the row driver controller 142-1 detects a rising edge of the external trigger ET, and generates the original storage control signal SS_OR and the overflow reset signal OS_RST to end the first sub integration period Tsi1.

As the overflow reset signal OS_RST transits to a high level at a time point T2, the overflow control signal OS transits to the high level and the photo diode PD is reset. The external trigger ET transits to a low level at a time point T3. The row driver controller 142-1 detects a falling edge of the external trigger ET and generates a pulse of the overflow set signal OS_SET.

As the external trigger ET transits to the low level at the time point T3, the overflow control signal OS transits to the low level due to the pulse of the overflow set signal OS_SET. As the overflow control signal OS transits to the low level, accumulation of photocharges by the photo diode PD begins.

In other words, the row driver controller 142-1 detects a falling edge of the external trigger ET and generates the overflow set signal OS_SET to begin the second sub integration period Tsi2. The operations performed from a time point T4 to a time point T6 are substantially the same as that performed from the time point T1 to the time point T3. Thus, descriptions of the operations from the time point T4 to the time point T6 will be omitted.

The ME period ends at the time point T7. Consequently, the integration period Tint may be divided into the first through third sub integration periods Tsi1 through Tsi3 by the external trigger ET, and photocharges accumulated in each of the first through third sub integration periods Tsi1 through Tsi3 may be transferred all together to the storage diode SD at the time point Tb.

Figure 7:
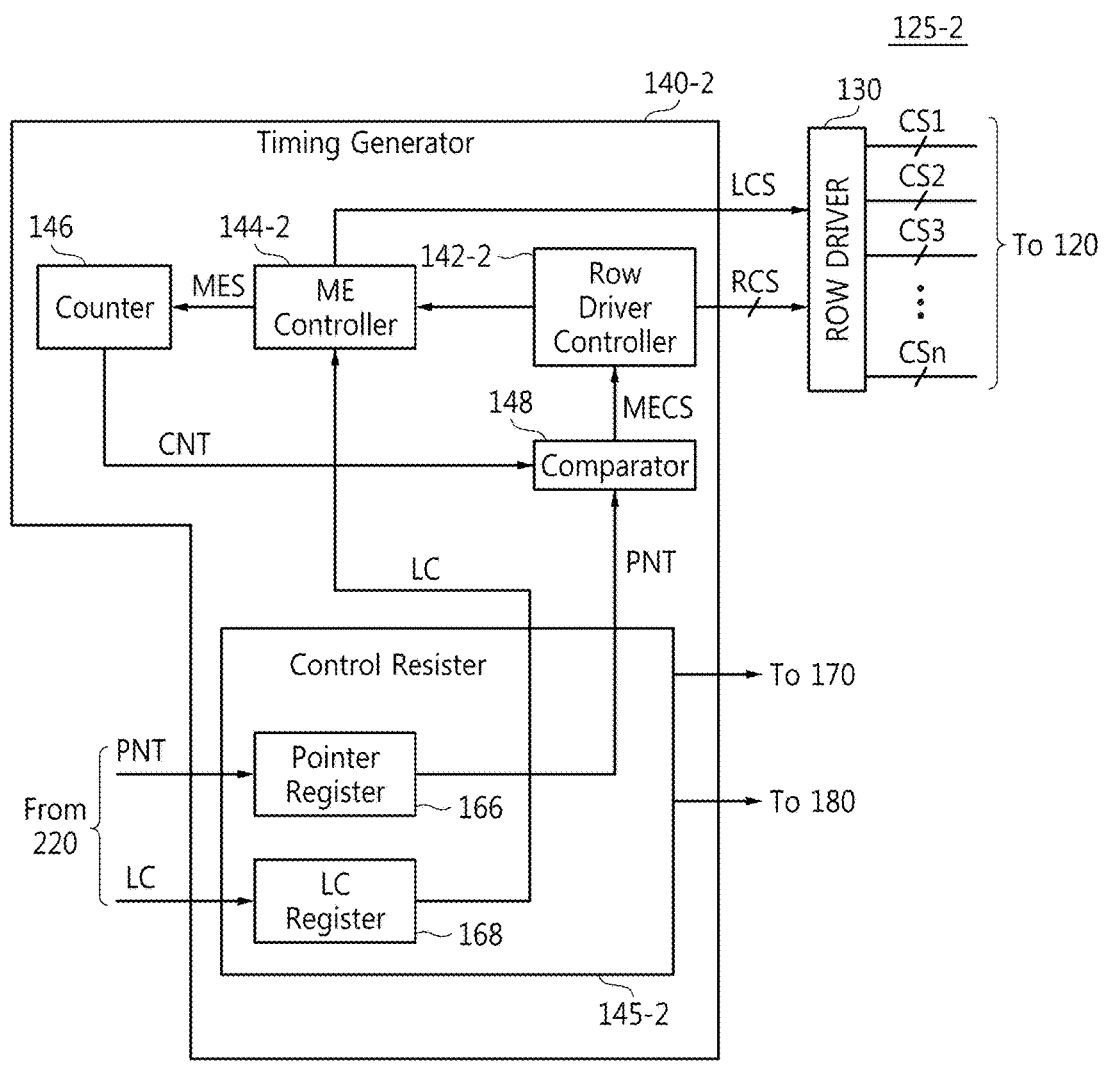
FIG. 7 is a block diagram of another example of a pixel controller illustrated in FIG. 1.
Figure 8:
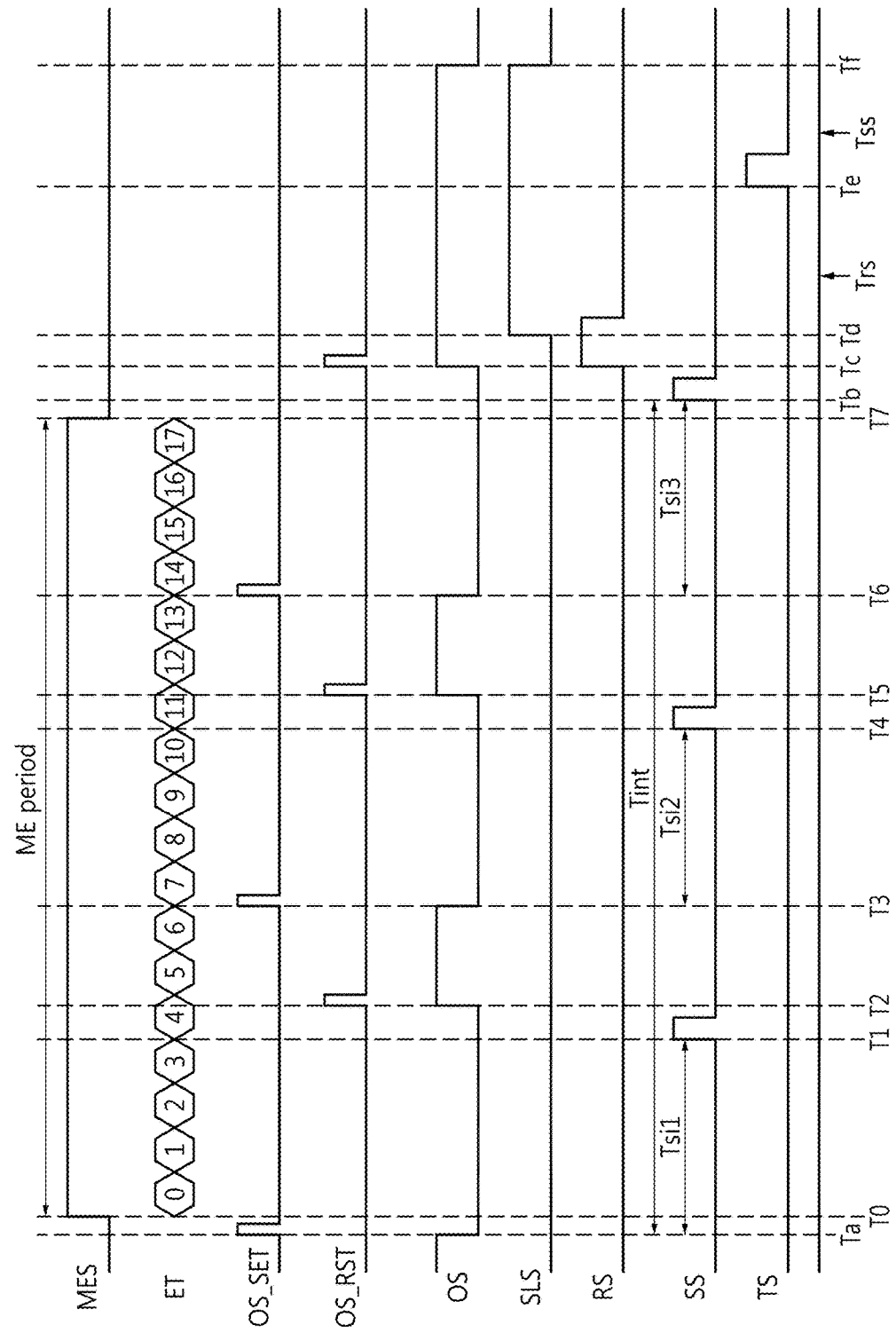
FIG. 8 is a timing chart showing the operation of the pixel controller illustrated in FIG. 7, according to an exemplary embodiment of the inventive concept.

FIG. 7 is a block diagram of another example 125-2 of the pixel controller 125 illustrated in FIG. 1. FIG. 8 is a timing chart showing an operation of a pixel controller 125-2 illustrated in FIG. 7. Referring to FIGS. 1 through 8, the pixel controller 125-2 may include the row driver 130 and a timing generator 140-2. The pixel controller 125-2 is similar to the pixel controller 125-1 illustrated in FIG. 5. Thus, differences between the pixel controllers 125-2 and 125-1 will mainly be described.

The timing generator 140-2 may include a row driver controller 142-2, an ME controller 144-2, a counter 146, a comparator 148, and a control register 145-2. The ME controller 144-2 may transmit the ME signal MES to the counter 146.

The counter 146 may begin to count a number of clock signal pulses when the ME signal MES is at the high level and transmit a count value CNT to the comparator 148. The clock signal may be an internally generated clock signal or an externally inputted clock signal. An interval at which the counter 146 performs counting may be predetermined but may be changed by the sensor controller 220 through the control register 145-2.

The comparator 148 may compare the pointer PNT received from the control register 145-2 with the count value CNT, generate a comparison result, and transmit the comparison result to the row driver controller 142-2 as the ME control signal MECS. The control register 145-2 may include a pointer register 166 and an LC register 168.

The pointer register 166 may temporarily store the pointer PNT received from the sensor controller 220, and transmit the pointer PNT to the comparator 148. The pointer PNT may be generated by the sensor controller 220 based on the ME signal MES. For instance, when the integration period Tint is divided into three sub integration periods Tsi1 through Tsi3, as shown in FIG. 8, the sensor controller 220 may generate the pointer PNT having four values of 4, 7, 11 and 14 during the integration period Tint. Although the integration period Tint is divided into three sub integration periods Tsi1 through Tsi3 in the embodiment illustrated in FIG. 8, the inventive concept is not limited thereto. The integration period Tint may be divided into at least two sub integration periods in other exemplary embodiments. At this time, the overflow control signal OS and the storage control signal SS may have a high level at least two times in the integration period Tint.

Values included in the pointer PNT may be randomly determined, but information about the pointer PNT may be provided to the image signal processor 210 for the process (such as a de-blurring process or an HDR process) performed by the image signal processor 210.

The operations performed from the time point Ta to the time point Tf and from the time point T0 to the time point T7 are substantially the same as those described with reference to FIG. 6. Thus, descriptions of the operation will be omitted. However, when the count value CNT is the same as the first and third values, i.e., 4 and 11, of the pointer PNT at the time points T1 and T4, respectively, the row driver controller 142-2 generates the original storage control signal SS_OR and the overflow reset signal OS_RST to end the first and second sub integration periods Tsi1 and Tsi2. In addition, when the count value CNT is the same as the second and fourth values, i.e., 7 and 14, of the pointer PNT at the time points T3 and T6, respectively, the row driver controller 142-2 generates the overflow set signal OS_SET to begin the second and third sub integration periods Tsi2 and Tsi3. An odd-numbered value of the pointer PNT may be defined as a first value and an even-numbered value of the pointer PNT may be defined as a second value.

FIGS. 9A through 9J are electric potential diagrams at different time points illustrated in FIG. 6 or 8. Referring to FIGS. 1 through 9J, FIG. 9A is the electric potential diagram obtained right before the time points Ta. As the overflow control signal OS remains at the high level, charges at the photo diode PD are discharged to the pixel voltage Vpix.

Figure 9A:
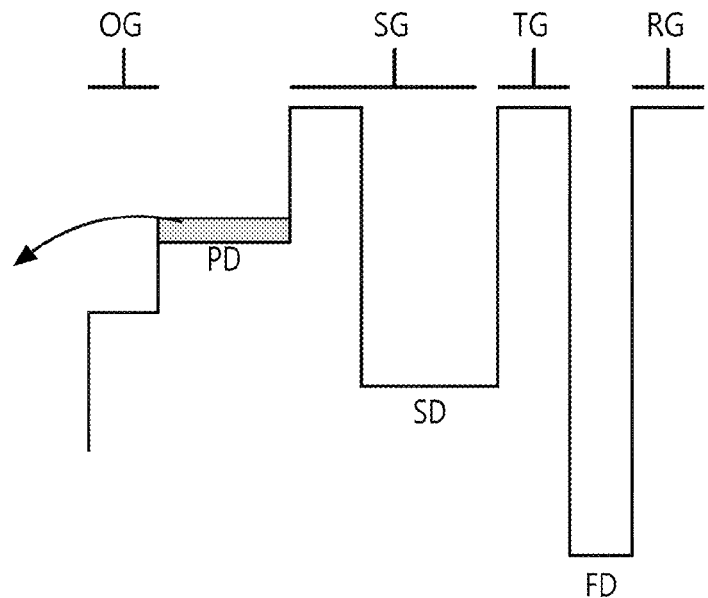
FIGS. 9A through 9J are electric potential diagrams at different time points illustrated in FIG. 6 or 8, according to exemplary embodiments of the inventive concept.
Figure 9B:
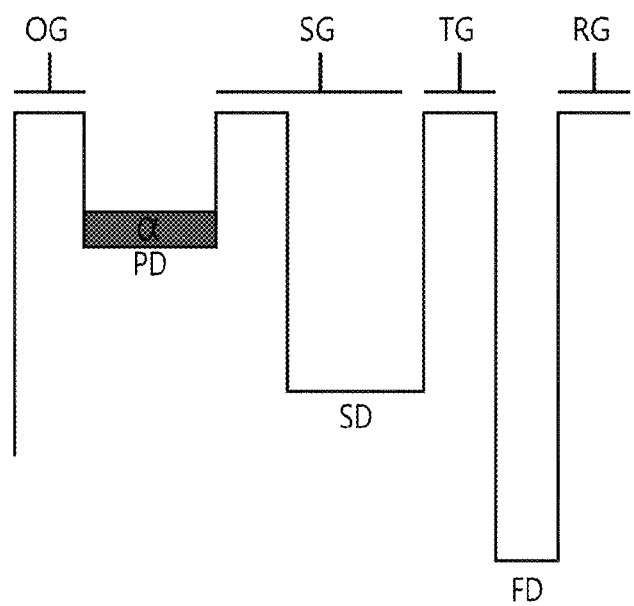

FIG. 9B is the electric potential diagram obtained in the first sub integration period Tsi1. As the overflow control signal OS transits to the low level, accumulation of photocharges by the photo diode PD begins. The photo diode PD accumulates charges generated from incident light during the first sub integration period Tsi1.

Figure 9C:
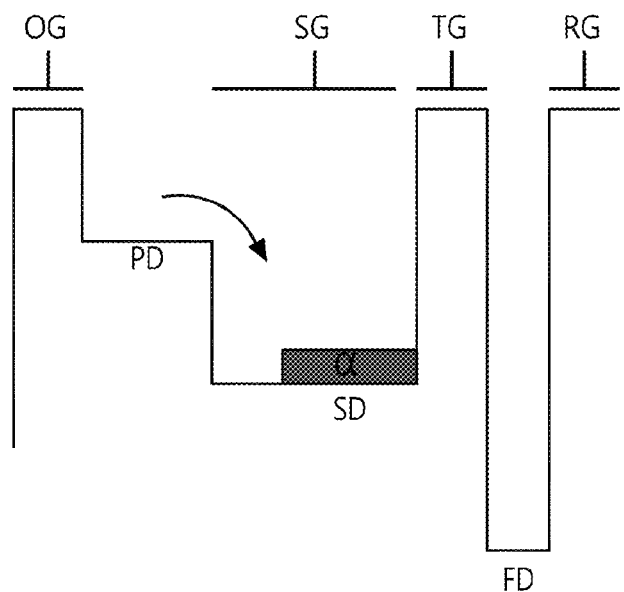

FIG. 9C is the electric potential diagram obtained right after the time points T1. Charges "α" accumulated at the photo diode PD during the first sub integration period Tsi1 are stored in the storage diode SD having a relatively high potential through the storage transistor SX.

Figure 9D:
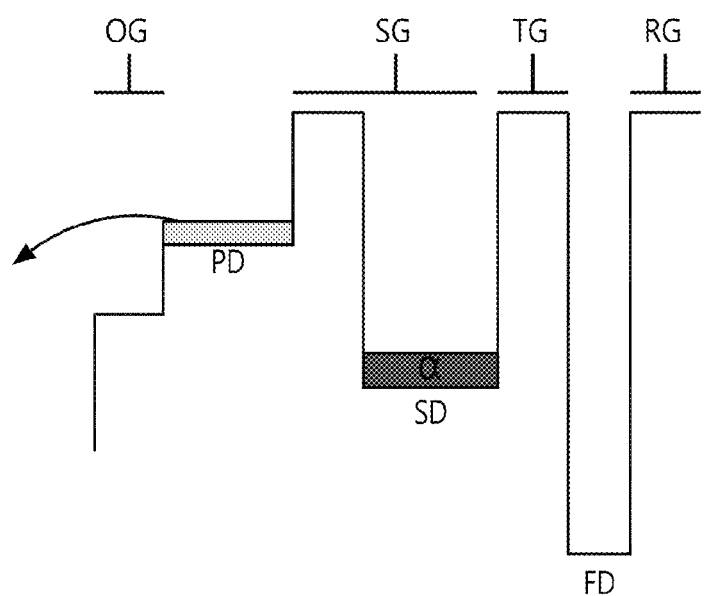

FIG. 9D is the electric potential diagram obtained right after the time points T2. As the overflow control signal OS transits to the high level, charges at the photo diode PD are discharged to the pixel voltage Vpix.

Figure 9E:
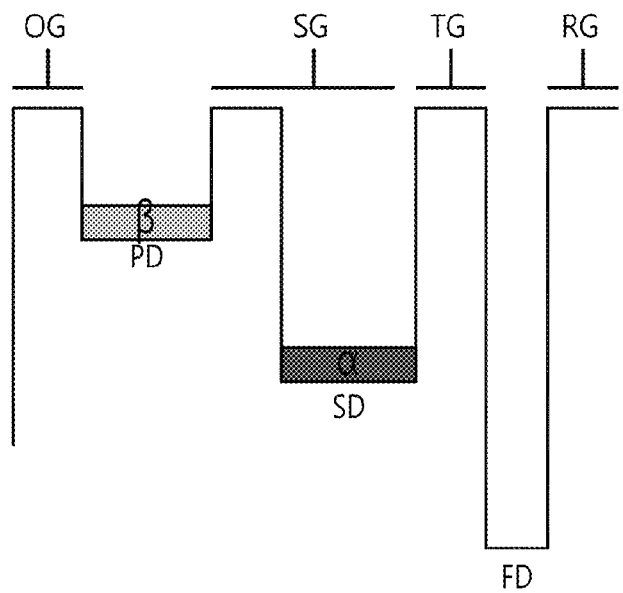

FIG. 9E is the electric potential diagram obtained in the second sub integration period Tsi2. As the overflow control signal OS transits to the low level, accumulation of photocharges by the photo diode PD begins. The photo diode PD accumulates charges generated from incident light during the second sub integration period Tsi2.

Figure 9F:
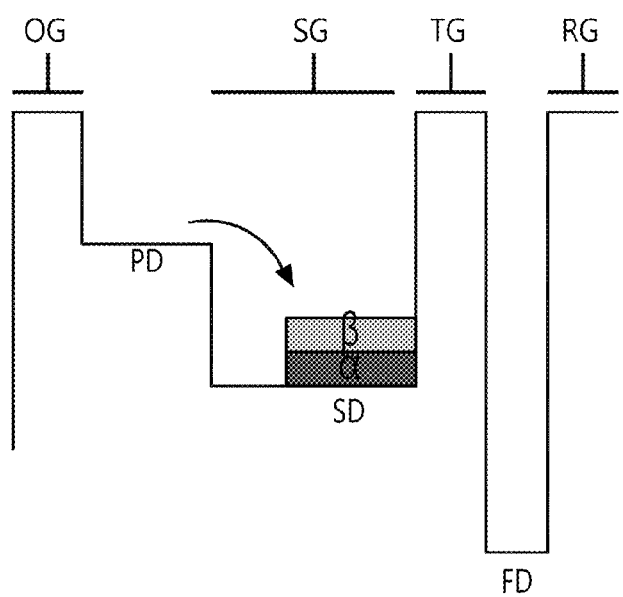

FIG. 9F is the electric potential diagram obtained right after the time points T4. Charges "β" accumulated at the photo diode PD during the second sub integration period Tsi2 are stored in the storage diode SD having a relatively high potential through the storage transistor SX. At this time, the charges "α+β" accumulated at the photo diode PD during the first and second sub integration periods Tsi1 and Tsi2 are stored together in the storage diode SD.

Figure 9G:
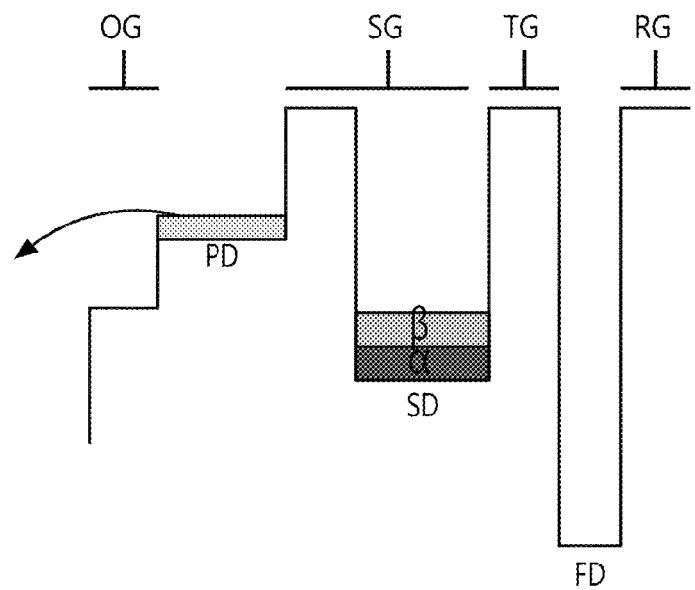

FIG. 9G is the electric potential diagram obtained right after the time points T5. As the overflow control signal OS transits to the high level, charges at the photo diode PD are discharged to the pixel voltage Vpix.

Figure 9H:
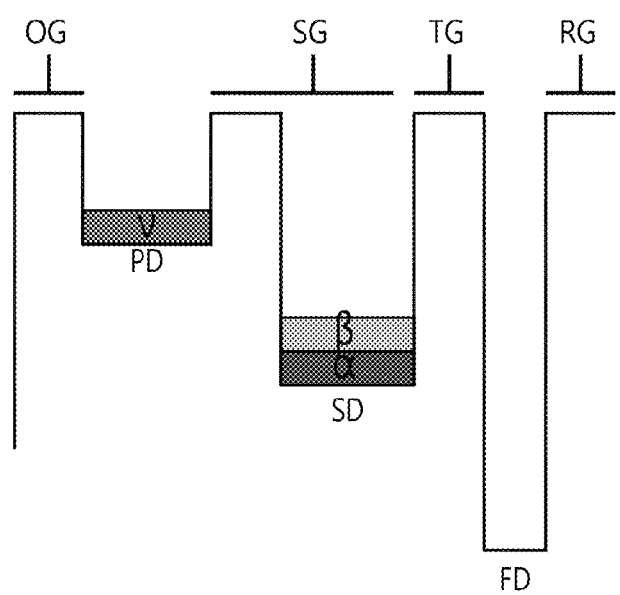

FIG. 9H is the electric potential diagram obtained in the third sub integration period Tsi3. As the overflow control signal OS transits to the low level, accumulation of photocharges by the photo diode PD begins. The photo diode PD accumulates charges generated from incident light during the third sub integration period Tsi3.

Figure 9I:
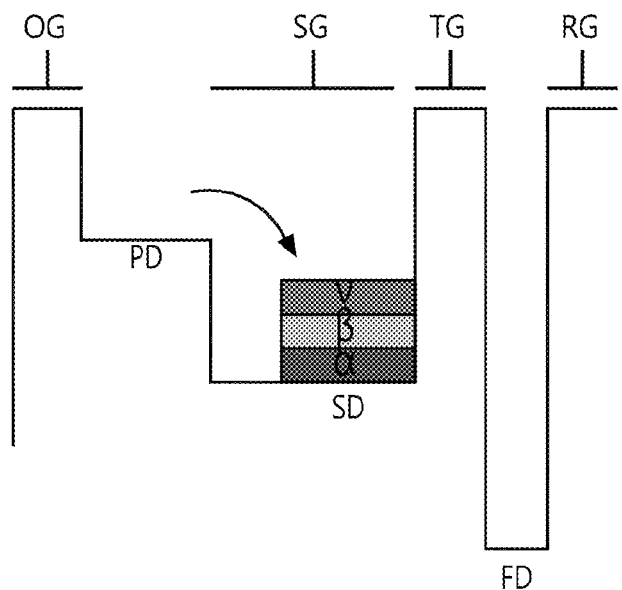

FIG. 9I is the electric potential diagram obtained right after the time points Tb. Charges "γ" accumulated at the photo diode PD during the third sub integration period Tsi3 are stored in the storage diode SD having a relatively high potential through the storage transistor SX. At this time, the charges "α+β+γ" accumulated at the photo diode PD during the first through third sub integration periods Tsi1 through Tsi3 are stored together in the storage diode SD.

Figure 9J:
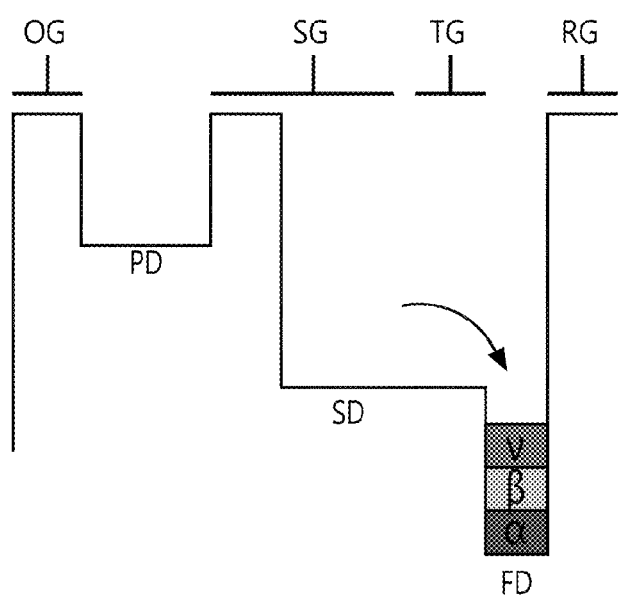

FIG. 9J is the electric potential diagram obtained right after the time points Te. Charges stored in the storage diode SD are transferred to and stored in the floating diffusion FD having a relative high potential. In other words, the charges "α+β+γ" accumulated at the photo diode PD during the first through third sub integration periods Tsi1 through Tsi3 are transferred to and stored in the floating diffusion FD.

Accordingly, the digital pixel signal DPS corresponding to the charges "α+β+γ" accumulated at the photo diode PD during the first through third sub integration periods Tsi1 through Tsi3 instead of the continuous integration period Tint may be transmitted to the image signal processor 210 and the image signal processor 210 may perform a de-blurring process based on the digital pixel signal DPS.

Figure 11:
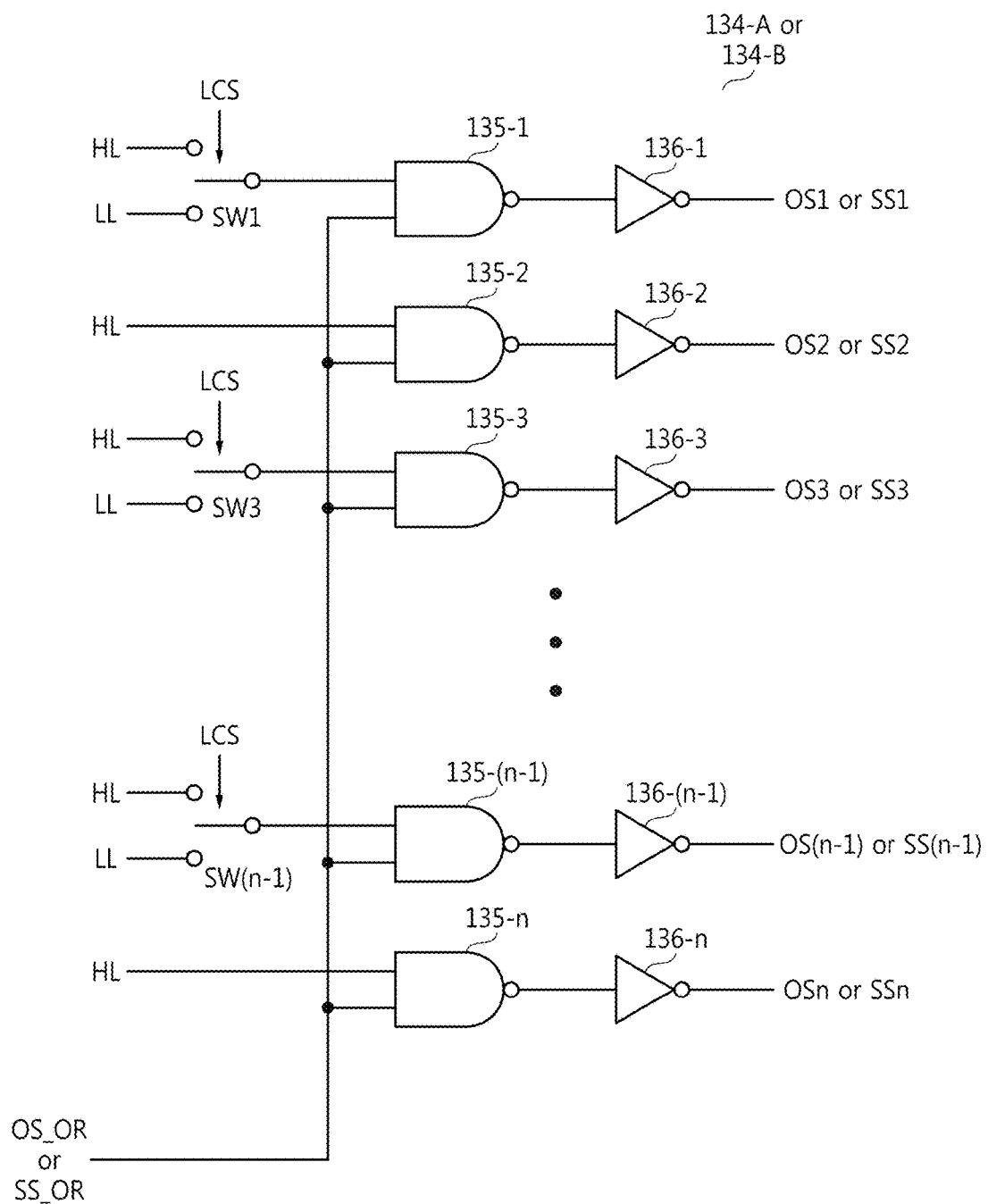
FIG. 11 is a block diagram of an overflow control signal controller or a storage control signal controller illustrated in FIG. 10, according to an exemplary embodiment of the inventive concept.

FIG. 10 is a block diagram of the row driver 130 illustrated in FIGS. 5 and 7 according to some exemplary embodiments of the inventive concept. FIG. 11 is a block diagram of an overflow control signal (OS) controller 134A or a storage control signal (SS) controller 134-B illustrated in FIG. 10 according to some exemplary embodiments of the inventive concept. Referring to FIGS. 1 through 11, the row driver 130 may include an OS generator 132 and a control signal (CS) controller 133.

The OS generator 132 may generate the original overflow control signal OS_OR in response to the overflow set or reset signal OS_SET or OS_RST among the row driver control signals RCS. The OS generator 132 may be implemented in a latch structure. The OS generator 132 may generate the original overflow control signal OS_OR that transits to the low level in response to a pulse of the overflow set signal OS_SET and transits to the high level in response to a pulse of the overflow reset signal OS_RST.

The CS controller 133 may generate the overflow control signals OS1 through OSn in response to the original overflow control signal OS_OR, the storage control signals SS1 through SSn in response to the original storage control signal SS_OR, the transfer control signals TS1 through TSn in response to the original transfer control signal TS_OR, the reset control signals RS1 through RSn in response to the original reset control signal RS_OR, and the selection control signals SLS1 through SLSn in response to the original selection control signal SLS_OR. The CS controller 133 may include the OS controller 134-A corresponding to the original overflow control signal OS_OR, the SS controller 134-B corresponding to the original storage control signal SS_OR, a transfer control signal (TS) controller 134-C corresponding to the original transfer control signal TS_OR, a reset control signal (RS) controller 134-D corresponding to the original reset control signal RS_OR, and a selection control signal (SLS) controller 134-E corresponding to the original selection control signal SLS_OR.

The controllers 134-A through 134-E may generate the overflow control signals OS1 through OSn, the storage control signals SS1 through SSn, the transfer control signals TS1 through TSn, the reset control signals RS1 through RSn, and the selection control signals SLS1 through SLSn using the original overflow control signal OS_OR, the original storage control signal SS_OR, the original transfer control signal TS_OR, the original reset control signal RS_OR, and original selection control signal SLS_OR, respectively, so that the integration period Tint is the same among all rows in the pixel array 120 and pixel signals of the respective rows in the pixel array 120 are sequentially read out.

The OS controller 134-A and the SS controller 134-B may buffer or transform the original overflow control signal OS_OR and the original storage control signal SS_OR, respectively, according to the line control signal LCS to generate the overflow control signals OS1 through OSn and the storage control signals SS1 through SSn. When the line control signal LCS is at the high level, the OS controller 134-A and the SS controller 134-B may respectively transform the original overflow control signal OS_OR and the original storage control signal SS_OR, which correspond to some (e.g., odd-numbered rows) of the rows in the pixel array 120, to have the low level. When the line control signal LCS is at the low level, the OS controller 134-A and the SS controller 134-B may just respectively buffer the original overflow control signal OS_OR and the original storage control signal SS_OR, which correspond to all of the rows in the pixel array 120, as they are.

FIG. 11 illustrates the OS controller 134-A or the SS controller 134-B. Although only the OS controller 134-A will be described for convenience' sake in the description, the structure and operations of the SS controller 134-B may be substantially the same as those of the OS controller 134-A. The OS controller 134-A may include a plurality of switches SW1 through SW(n−1), a plurality of NAND gates 135-1 through 135-n, and a plurality of inverters 136-1 through 136-n.

The switches SW1 through SW(n−1) may transmit a high level HL or a low level LL as a first input to the NAND gates 135-1, 135-3, . . . respectively corresponding to odd-numbered rows in response to the line control signal LCS. Here, the high level HL may be a logic value corresponding to the high level of the original overflow control signal OS_OR, and the low level LL may be a logic value corresponding to the low level of the original overflow control signal OS_OR.

When the line control signal LCS is at the high level, the switches SW1 through SW(n−1) may output the low level LL as the first input. Contrarily, when the line control signal LCS is at the low level, the switches SW1 through SW(n−1) may output the high level HL as the first input.

Each of the NAND gates 135-1 through 135-n may receive the original overflow control signal OS_OR as a second input. In addition, each of the even-numbered NAND gates 135-2, 135-4, . . . may receive the high level HL as the first input.

Each of the NAND gates 135-1 through 135-n may output a result of performing NAND operation on the first input and the second input to a corresponding one of the inverters 136-1 through 136-n. The inverters 136-1 through 136-n may invert NAND operation results to output the overflow control signals OS1 through OSn, respectively.

When the line control signal LCS is at the high level, the switches SW1 through SW(n−1) transmit the low level LL as the first input, and therefore, the overflow control signals OS1, OS3, . . . corresponding to the odd-numbered rows are at the low level regardless of the second input, and the overflow control signals OS2, OS4, . . . corresponding to the even-numbered rows are the same as the original overflow control signal OS_OR. When the line control signal LCS is at the low level, the switches SW1 through SW(n−1) transmit the high level HL as the first input, and therefore, the overflow control signals OS1 through OSn corresponding to all of the rows are the same as the original overflow control signal OS_OR.

Although the OS controller 134-A is designed such that overflow control signals corresponding to odd-numbered rows are different from those corresponding to even numbered rows when the line control signal LCS is at the high level in the embodiment illustrated in FIG. 11, the inventive concept is not limited thereto. Groups of rows for which different overflow control signals are generated may be randomly set, but information about setting of the groups may be provided to the image signal processor 210 for the process (e.g., the de-blurring or HDR process) performed by the image signal processor 210.

Figure 12:
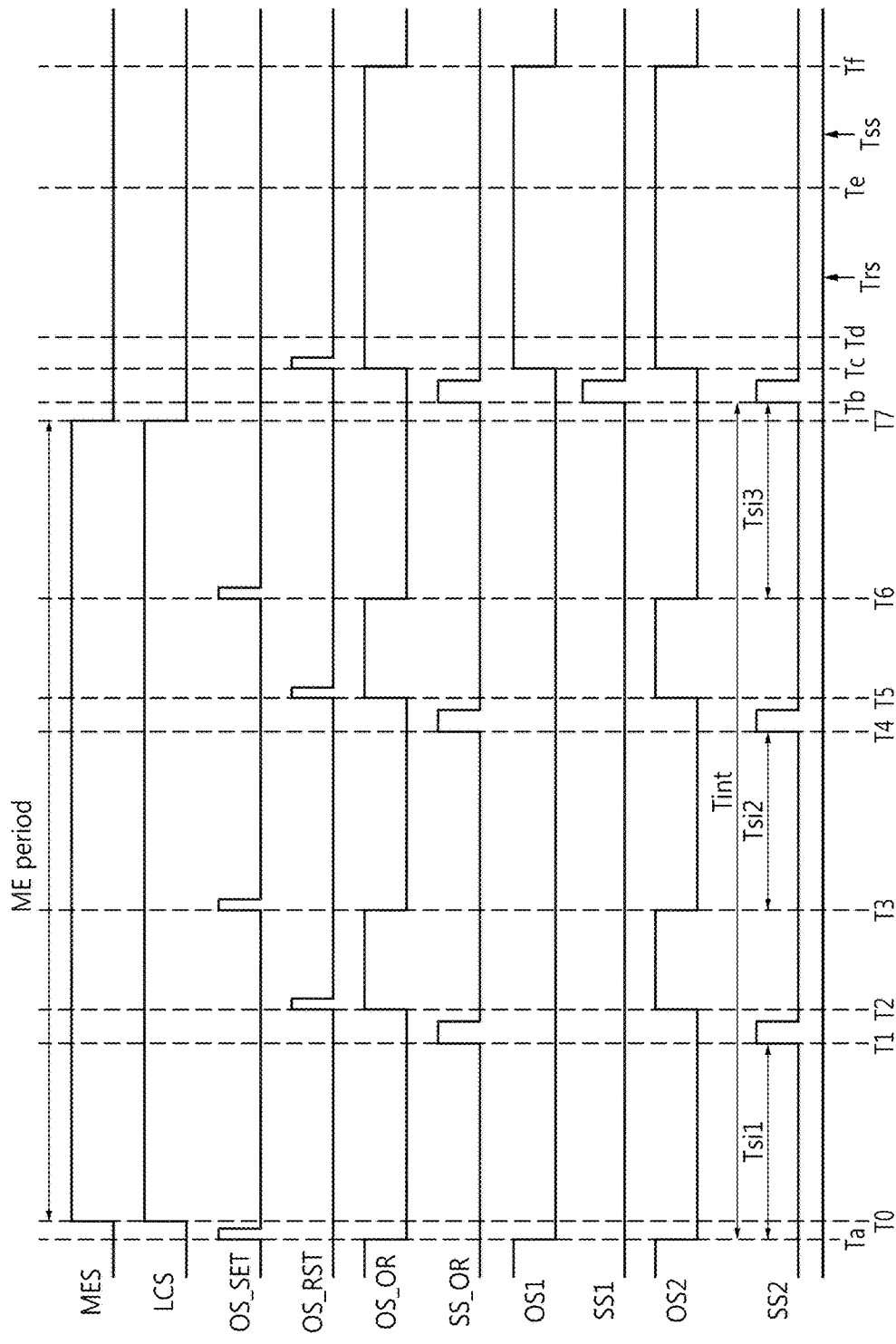
FIG. 12 is a timing chart showing the operation of the row driver illustrated in FIG. 10, according to an exemplary embodiment of the inventive concept.

FIG. 12 is a timing chart showing the operation of the row driver 130 illustrated in FIG. 10. Referring to FIGS. 1 through 12, it is assumed that the line control signal LCS is the same as the ME signal MES. The operations performed from the time point Ta to the time point Tf and from the time point T0 to the time point T7 are substantially the same as those described with reference to FIG. 6 or 8. Thus, descriptions of the operation will be omitted.

When the line control signal LCS is at the high level, the overflow control signal OS1 and the storage control signal SS1 input to a first row which is an odd-numbered row according to the operation of the CS controller 133 may be signals obtained by transforming the original overflow control signal OS_OR and the original storage control signal SS_OR to have the low level. The overflow control signal OS2 and the storage control signal SS2 input to a second row which is an even-numbered row may be signals obtained by just buffering the original overflow control signal OS_OR and the original storage control signal SS_OR as they are.

Although a case where the line control signal LCS is at the low level in the integration time Tint is not illustrated, the overflow control signals OS1 and OS2 and the storage control signals SS1 and SS2 input to the first and second rows according to the operation of the CS controller 133 when the line control signal LCS is at the low level may be signals obtained by just buffering the original overflow control signal OS_OR and the original storage control signal SS_OR as they are.

Consequently, for a single frame, the digital pixel signal DPS corresponding to the charges "α+β+γ" accumulated at the photo diode PD during the first through third sub integration periods Tsi1 through Tsi3 and the digital pixel signal DPS corresponding to the charges "k" accumulated at the photo diode PD during the continuous integration period Tint may be transmitted to the image signal processor 210, and the image signal processor 210 may perform an HDR process based on these digital pixel signals DPS. In addition, the image signal processor 210 may also perform a de-blurring process based on the digital pixel signal DPS corresponding to the charges "α+β+γ" accumulated at the photo diode PD during the first through third sub integration periods Tsi1 through Tsi3, that is, the digital pixel signal DPS corresponding to an even-numbered row.

Figure 13:
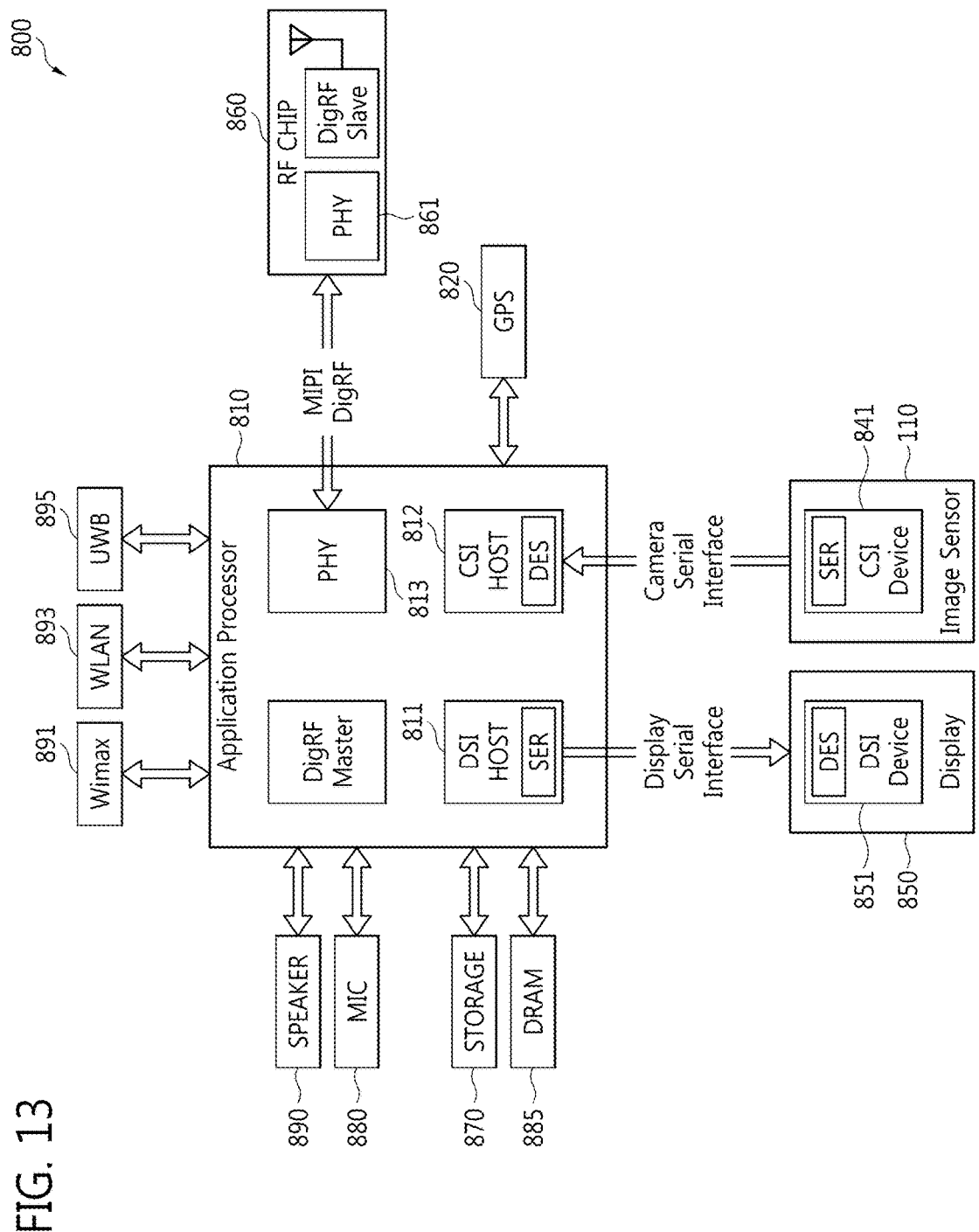
FIG. 13 is a block diagram of an electronic system including an image sensor, according to an exemplary embodiment of the inventive concept.

FIG. 13 is a block diagram of an electronic system including the image sensor according to some exemplary embodiments of the inventive concept. The electronic system 800 may be implemented by a data processing apparatus, such as a mobile phone, a personal digital assistant (PDA), a portable media player (PMP), an Internet protocol television (IP TV), or a smart phone that can use or support the mobile industry processor interface (MIPI). The electronic system 800 includes the image sensor 110, an application processor 810 and a display 850.

A camera serial interface (CSI) host 812 included in the application processor 810 performs serial communication with a CSI device 841 included in the image sensor 110 through CSI. For example, an optical de-serializer (DES) may be implemented in the CSI host 812, and an optical serializer (SER) may be implemented in the CSI device 841.

A display serial interface (DSI) host 811 included in the application processor 810 performs serial communication with a DSI device 851 included in the display 850 through DSI. For example, an optical serializer may be implemented in the DSI host 811, and an optical de-serializer may be implemented in the DSI device 851.

The electronic system 800 may also include a radio frequency (RF) chip 860 which communicates with the application processor 810. A physical layer (PHY) 813 of the electronic system 800 and a PHY of the RF chip 860 communicate data with each other according to MIPI DigRF standard. The electronic system 800 may further include at least one element among a GPS 820, a storage device 870, a microphone 880, a DRAM 885 and a speaker 890. The electronic system 800 may communicate using Wimax (World Interoperability for Microwave Access) 891, WLAN (Wireless LAN) 893 and/or UWB (Ultra Wideband) 895 etc.

Figure 14:
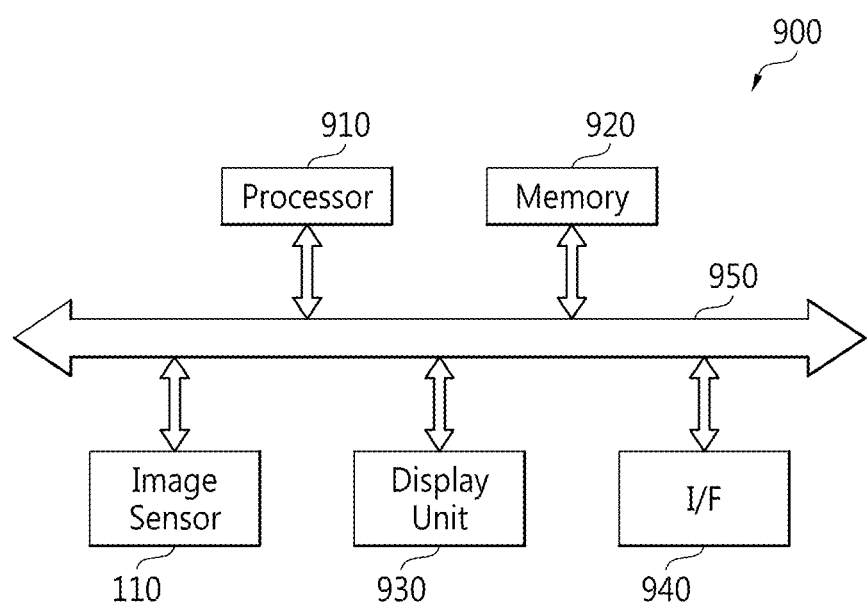
FIG. 14 is a block diagram of an electronic system including the image sensor, according to an exemplary embodiment of the inventive concept.

FIG. 14 is a block diagram of an electronic system 900 including the image sensor 110 according to other exemplary embodiments of the inventive concept. Referring to FIG. 14, the electronic system 900 may include the image sensor 110, a processor 910, a memory 920, a display unit 930, and an I/F 940.

The processor 910 may control the operation of the image sensor 110. The processor 910 may process pixel signals from the image sensor 110 and generate image data.

The memory 920 may store a program for controlling the operation of the image sensor 110 and may also store the image data generated by the processor 910. The processor 910 may execute the program stored in the memory 920. The memory 920 may be formed as a volatile memory or a non-volatile memory.

The display unit 930 may receive the image data from the processor 910 or the memory 920 and display the image data on a display. For example, the display unit 930 may be a liquid crystal display (LCD), a light emitting diode (LED) display, an organic light emitting diode (OLED) display, an active-matrix organic light emitting diode (AMOLED) or a flexible display.

The I/F 940 may be formed for the input and output of the image data. The I/F 940 may be implemented as a wireless I/F.

The above embodiments can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), compact disc (CD)-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

At least one of the components, elements or units represented by a block as illustrated in FIGS. 1, 5, 7, 10 and 11 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

As described above, according to the above embodiments of the inventive concept, a continuous integration period is divided into separate sub integration periods for exposure in global shutter mode, so that a de-blurring process can be performed based on a pixel signal in an image sensor and an image processing system including the image sensor. In addition, an exposure time is controlled to be different among different row groups in the global shutter mode, so that an HDR process can be performed based on a pixel signal.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. An image sensor that operates in a global shutter mode, the image sensor comprising;
   a pixel array comprising a plurality of pixels arranged in a plurality of rows and a plurality of columns;
   a timing generator configured to generate a plurality of row driver control signals that control a first integration period of a first pixel of the plurality of pixels to comprise at least two sub integration periods, based on a multi-exposure control signal; and
   a row driver configured to generate a plurality of row control signals that control each of the plurality of rows in the pixel array, based on the plurality of row driver control signals,
   wherein the timing generator is further configured to control a single image frame to comprise the first integration period and a readout period of the first pixel, based on the plurality of row driver control signals, and
   wherein the timing generator comprises:
      a multi-exposure controller configured to generate a multi-exposure signal having a high level corresponding to a multi-exposure period in the first integration period;
      a multi-exposure register configured to temporarily store the multi-exposure signal, and transmit the multi-exposure signal to a sensor controller; and
      a row driver controller configured to generate the plurality of row driver control signals, based on the multi-exposure control signal.

2. The image sensor of claim 1, wherein the row driver is further configured to control to accumulate photocharges at the first pixel during each of the at least two sub integration periods, and reset the first pixel at an end of each of the at least two sub integration periods, based on the plurality of row control signals.

3. The image sensor of claim 2, wherein the first pixel comprises a photo element and a storage element, and
   wherein the row driver is further configured to control to accumulate the photocharges at the photo element, and transfer the accumulated photocharges to the storage element for storing thereat at the end of each of the at least two sub integration periods, based on the plurality of row control signals.

4. The image sensor of claim 1, wherein the plurality of row control signals comprise an overflow control signal and a storage control signal, and
   wherein each of the overflow control signal and the storage control signal has a high level at least two times in the first integration period.

5. The image sensor of claim 1, wherein the timing generator further comprises an external trigger register configured to temporarily store an external trigger generated by the sensor controller based on the multi-exposure signal, and output the external trigger as the multi-exposure control signal to the row driver controller.

6. The image sensor of claim 5, wherein the row driver controller is further configured to:
   first detect a rising edge of the external trigger, and in response to the detected rising edge, generate the plurality of row driver control signals that control one of the at least two sub integration periods to end; and
   second detect a falling edge of the external trigger, and in response to the detected falling edge, generate the plurality of row driver control signals that control one of the at least two sub integration periods to begin.

7. The image sensor of claim 5, wherein the multi-exposure period is randomly determined.

8. The image sensor of claim 1, wherein the timing generator is further configured to generate a line control signal having the high level in the multi-exposure period, and
   wherein the row driver comprises:
      a control signal generator configured to generate a plurality of original row control signals corresponding to the plurality of row driver control signals; and
      a control signal controller configured to generate the plurality of row control signals by buffering or transforming the plurality of original row control signals, based on the line control signal.

9. The image sensor of claim 8, wherein the control signal controller is further configured to buffer the plurality of original row control signals corresponding to all of the plurality of rows in response to the line control signal being at a low level.

10. An image processing system comprising:
    the image sensor of claim 2 further configured to perform analog-to-digital conversion on a first pixel signal corresponding to the photocharges to generate a digital pixel signal; and
    an image signal processor configured to process the digital pixel signal to generate image data.

11. The image processing system of claim 10, wherein the image signal processor is further configured to perform one of a de-blurring process and a high dynamic range (HDR) process on the digital pixel signal.

12. An image sensor that operates in a global shutter mode, the image sensor comprising:
    a pixel array comprising a plurality of pixels arranged in a plurality of rows and a plurality of columns, each pixel being configured to generate a first pixel signal corresponding to photocharges; and
    a pixel controller configured to control a first integration period of a first pixel of the plurality of pixels to comprise at least two sub integration periods,
    wherein the first integration period is a period between two successive readout periods of the first pixel, and
    wherein the pixel controller comprises:
       a multi-exposure controller configured to generate a multi-exposure signal having a high level corresponding to a multi-exposure period in the first integration period;
       a counter configured to begin to count a number of clock signal pulses in response to the multi-exposure signal to generate a count value;
       a pointer register configured to temporarily store a pointer that is received from a sensor controller, and output the pointer;
       a comparator configured to output a result of comparing the pointer with the count value as a control signal; and
       a row driver controller configured to control the first integration period, based on the control signal.

13. The image sensor of claim 12, wherein the row driver controller is further configured to:
    control one of the at least two sub integration periods to end in response to the count value being the same as a first value of the pointer; and
    control one of the at least two sub integration periods to begin in response to the count value being the same as a second value of the pointer.

14. The image sensor of claim 12, further comprising a row driver configured to control to accumulate the photocharges at the first pixel during each of the at least two sub integration periods, and reset the first pixel at an end of each of the at least two sub integration periods.

15. The image sensor of claim 14, wherein the first pixel comprises a photo element and a storage element, and
   wherein the row driver is further configured to control to accumulate the photocharges at the photo element, and transfer the accumulated photocharges to the storage element for storing thereat at the end of each of the at least two sub integration periods.

16. The image sensor of claim 15, wherein the photo element comprises a photo diode, and the storage element comprises a storage diode.

17. The image sensor of claim 12, wherein the multi-exposure period is randomly determined.

18. A method of controlling an image sensor comprising a plurality of pixels arranged in a plurality of rows and a plurality of columns, the method comprising:
   generating a plurality of row driver control signals that control a first integration period of a first pixel of the plurality of pixels to comprise at least two sub integration periods, the first integration period being a period included in a single image frame that also includes a readout period of the first pixel;
   generating a line control signal having a high level corresponding to a multi-exposure period in the first integration period;
   generating a plurality of original row control signals corresponding to the plurality of row driver control signals; and
   buffering or transforming the plurality of original row control signals, based on the line control signal, to generate a plurality of row control signals that control to accumulate photocharges at the first pixel during each of the at least two sub integration periods, and reset the first pixel at an end of each of the at least two sub integration periods.

19. The method of claim 18, wherein the accumulating the photocharges at the first pixel comprises accumulating the photocharges at a photo element of the first pixel, and
   wherein the resetting the first pixel comprises transferring the accumulated photocharges to a storage element of the first pixel for storing thereat at the end of each of the at least two sub integration periods.

20. The method of claim 18, wherein the multi-exposure period is randomly determined.

\* \* \* \* \*